(12) United States Patent
Shapiro et al.

(10) Patent No.: US 11,305,379 B2
(45) Date of Patent: Apr. 19, 2022

(54) PRESET OPTICAL COMPONENTS IN A COMPUTER NUMERICALLY CONTROLLED MACHINE

(71) Applicant: Glowforge Inc., Seattle, WA (US)

(72) Inventors: Daniel Shapiro, Mercer Island, WA (US); Mark Gosselin, Seattle, WA (US); Jared Kofron, Seattle, WA (US)

(73) Assignee: Glowforge Inc., Seattle, WA (US)

( * ) Notice: Subject to any disclaimer, the term of this patent is extended or adjusted under 35 U.S.C. 154(b) by 546 days.

(21) Appl. No.: 15/823,512

(22) Filed: Nov. 27, 2017

(65) Prior Publication Data

US 2018/0147659 A1 May 31, 2018

Related U.S. Application Data

(60) Provisional application No. 62/426,438, filed on Nov. 25, 2016.

(51) Int. Cl.
   *B23K 26/042* (2014.01)
   *B23K 26/38* (2014.01)
   (Continued)

(52) U.S. Cl.
   CPC .......... *B23K 26/042* (2015.10); *B23K 26/035* (2015.10); *B23K 26/0643* (2013.01);
   (Continued)

(58) Field of Classification Search
   CPC ...... B23K 26/042; B23K 26/38; B23K 26/08; B23K 26/035; B23K 26/082;
   (Continued)

(56) References Cited

U.S. PATENT DOCUMENTS 3,721,811 A 3/1973 Taylor et al.
3,967,176 A 6/1976 Wagener et al.
(Continued)

FOREIGN PATENT DOCUMENTS

CN 101095033 A 12/2007
CN 101733558 A 6/2010
(Continued)

OTHER PUBLICATIONS

Dazhong Wu et al. "Cloud Manufacturing: Drivers, Current Status, and Future Trends." vol. 2. Systems; Micro And Nano Technologies Sustainable Manufacturing. Jun. 10, 2013. Retrieved on May 10, 2016. pp. 1-10.

(Continued)

*Primary Examiner* — Paul R Durand
*Assistant Examiner* — Randall A Gruby
(74) *Attorney, Agent, or Firm* — Lee Sullivan Shea & Smith LLP

(57) ABSTRACT

A system can include a head of a computer numerically controlled machine configured to deliver electromagnetic energy sufficient to cause a change in a material at least partially contained within an interior space of the computer numerically controlled machine. The system can further include an optical system comprising a plurality of optical elements in the computer numerically controlled machine. The plurality of optical elements can be oriented at a fixed angle to each other to deliver the electromagnetic energy from the head to the material.

13 Claims, 10 Drawing Sheets

(51) Int. Cl.
  *B23K 26/08* (2014.01)
  *B23K 26/035* (2014.01)
  *B23K 26/082* (2014.01)
  *B23K 37/02* (2006.01)
  *B23K 26/06* (2014.01)

(52) U.S. Cl.
  CPC ............ *B23K 26/08* (2013.01); *B23K 26/082* (2015.10); *B23K 26/0876* (2013.01); *B23K 26/38* (2013.01); *B23K 37/0211* (2013.01); *B23K 37/0235* (2013.01)

(58) Field of Classification Search
  CPC ............ B23K 26/0643; B23K 26/0876; B23K 37/0211; B23K 37/0235; G02B 7/00–40
  See application file for complete search history.

(56) References Cited

U.S. PATENT DOCUMENTS

| | | | |
|---|---|---|---|
| 4,055,787 A * | 10/1977 | Beadle | G05B 19/18 318/591 |
| 4,138,718 A | 2/1979 | Toke et al. | |
| 4,383,762 A * | 5/1983 | Burkert | G01J 3/4532 356/455 |
| 4,518,843 A * | 5/1985 | Antol | B23K 26/035 219/121.63 |
| 4,589,729 A * | 5/1986 | Bridges | B23K 26/06 385/125 |
| 4,650,287 A | 3/1987 | Kudo et al. | |
| 4,723,219 A | 2/1988 | Beyer et al. | |
| 4,863,538 A * | 9/1989 | Deckard | B33Y 10/00 264/497 |
| 4,894,831 A * | 1/1990 | Alfrey | H01S 3/094038 372/19 |
| 4,901,359 A | 2/1990 | Bruder | |
| 4,918,611 A | 4/1990 | Shyu et al. | |
| 4,998,260 A * | 3/1991 | Taniura | B23K 26/043 356/141.3 |
| 5,298,843 A | 3/1994 | Miyajima et al. | |
| 5,355,250 A | 10/1994 | Grasso et al. | |
| 5,396,279 A | 3/1995 | Vossen | |
| 5,475,521 A | 12/1995 | Heidemann | |
| 5,585,018 A | 12/1996 | Kanaoka et al. | |
| 5,682,319 A | 10/1997 | Boland et al. | |
| 5,756,961 A | 5/1998 | Sato et al. | |
| 6,031,200 A | 2/2000 | Whitehouse | |
| 6,085,122 A | 7/2000 | Manning | |
| 6,087,625 A * | 7/2000 | Iso | B23K 26/0673 219/121.6 |
| 6,284,999 B1 * | 9/2001 | Virtanen | B23K 26/046 219/121.67 |
| 6,326,586 B1 * | 12/2001 | Heyerick | B23K 26/046 219/121.67 |
| 6,420,674 B1 | 7/2002 | Cole, III et al. | |
| 6,420,675 B1 * | 7/2002 | Lizotte | B23K 26/04 219/121.7 |
| 6,483,596 B1 * | 11/2002 | Philippi | G05B 19/4015 356/614 |
| 6,498,653 B1 * | 12/2002 | Wang | G01B 11/005 356/498 |
| 6,528,758 B2 * | 3/2003 | Shaffer | D06Q 1/00 219/121.68 |
| 6,609,044 B1 | 8/2003 | Basista et al. | |
| 6,628,322 B1 | 9/2003 | Cerruti | |
| 6,696,667 B1 * | 2/2004 | Flanagan | B23K 26/0823 219/121.72 |
| 7,005,606 B2 | 2/2006 | Legge et al. | |
| 7,456,372 B2 * | 11/2008 | Hiramatsu | B23K 26/032 219/121.7 |
| 8,111,904 B2 | 2/2012 | Wallack et al. | |
| 8,136,432 B2 | 3/2012 | Travez et al. | |
| 8,786,928 B2 * | 7/2014 | Dolleris | G02B 26/101 359/212.2 |
| 8,809,780 B2 | 8/2014 | Wollenhaupt et al. | |
| 8,921,734 B2 * | 12/2014 | Yerazunis | B23K 26/0876 219/121.67 |
| 9,020,628 B2 | 4/2015 | Fagan | |
| 9,114,478 B2 * | 8/2015 | Scott | B23K 26/12 |
| 9,235,205 B2 | 1/2016 | Prestidge et al. | |
| 9,469,338 B2 | 10/2016 | Norberg Ohlsson | |
| 9,618,926 B1 | 4/2017 | Louette et al. | |
| 9,734,419 B1 | 8/2017 | Ye et al. | |
| 9,772,067 B2 | 9/2017 | Bunz et al. | |
| 9,782,906 B1 | 10/2017 | Aminpour et al. | |
| 9,912,915 B2 | 3/2018 | Sinclair | |
| 9,987,798 B2 | 6/2018 | Tyler | |
| 10,106,864 B2 * | 10/2018 | Zeng | C21D 1/70 |
| 10,234,260 B2 | 3/2019 | Siercks et al. | |
| D850,528 S * | 6/2019 | Gosselin | D18/34.3 |
| 10,557,701 B2 * | 2/2020 | Jiang | G01B 9/02091 |
| 10,578,851 B2 * | 3/2020 | Fletcher | G02B 21/0008 |
| 10,642,251 B2 | 5/2020 | Platts et al. | |
| 10,898,970 B2 * | 1/2021 | Ishiguro | B23K 26/0665 |
| 10,919,111 B2 * | 2/2021 | Rubens | B23K 26/042 |
| 10,942,327 B2 * | 3/2021 | Okubo | G02B 7/04 |
| 10,950,471 B2 * | 3/2021 | Shionoya | B23K 26/0006 |
| 10,953,496 B2 * | 3/2021 | Mauersberger | B23K 26/382 |
| 2001/0012973 A1 | 8/2001 | Wehrli et al. | |
| 2002/0129485 A1 | 9/2002 | Mok et al. | |
| 2002/0144987 A1 * | 10/2002 | Tomlinson | B23K 26/0892 219/121.74 |
| 2003/0049373 A1 | 3/2003 | Van De Rijdt et al. | |
| 2004/0029493 A1 | 2/2004 | Tricard et al. | |
| 2004/0060910 A1 | 4/2004 | Schramm | |
| 2004/0207831 A1 | 10/2004 | Aoyama | |
| 2004/0223165 A1 | 11/2004 | Kurokawa et al. | |
| 2004/0245227 A1 * | 12/2004 | Grafton-Reed | B23K 26/043 219/121.83 |
| 2005/0051523 A1 * | 3/2005 | Legge | B23K 26/043 219/121.83 |
| 2005/0069682 A1 | 3/2005 | Tseng | |
| 2005/0071020 A1 | 3/2005 | Yamazaki et al. | |
| 2005/0115941 A1 | 6/2005 | Sukhman et al. | |
| 2005/0142701 A1 | 6/2005 | Yamaguchi et al. | |
| 2005/0187651 A1 | 8/2005 | Kimura et al. | |
| 2006/0022379 A1 * | 2/2006 | Wicker | B33Y 30/00 264/255 |
| 2006/0043615 A1 | 3/2006 | Zheng et al. | |
| 2007/0000889 A1 * | 1/2007 | Yamazaki | B23K 26/04 219/121.83 |
| 2007/0032733 A1 | 2/2007 | Burton | |
| 2007/0034615 A1 * | 2/2007 | Kleine | A61F 2/91 219/121.72 |
| 2007/0181544 A1 | 8/2007 | Sukhman et al. | |
| 2008/0058734 A1 | 3/2008 | Hanft et al. | |
| 2008/0100829 A1 | 5/2008 | Watson | |
| 2008/0101687 A1 | 5/2008 | Goeller | |
| 2008/0149604 A1 | 6/2008 | Varriano-Marston et al. | |
| 2008/0160254 A1 | 7/2008 | Arnold | |
| 2008/0218735 A1 * | 9/2008 | Atsumi | B23K 26/048 356/72 |
| 2008/0243299 A1 | 10/2008 | Johnson et al. | |
| 2008/0249653 A1 | 10/2008 | Ichikawa | |
| 2009/0060386 A1 * | 3/2009 | Cooper | G02B 26/101 382/294 |
| 2009/0120914 A1 | 5/2009 | Lawrence | |
| 2009/0250445 A1 | 10/2009 | Yamaguchi et al. | |
| 2009/0308851 A1 | 12/2009 | Harnisch et al. | |
| 2010/0063603 A1 | 3/2010 | Chandhoke | |
| 2010/0081971 A1 | 4/2010 | Allison | |
| 2010/0149337 A1 | 6/2010 | Porcino | |
| 2010/0193482 A1 | 8/2010 | Ow et al. | |
| 2010/0193483 A1 * | 8/2010 | Chen | B23K 26/0823 219/121.72 |
| 2010/0274379 A1 | 10/2010 | Hehl | |
| 2010/0292947 A1 * | 11/2010 | Buk | B23K 26/082 702/94 |
| 2010/0301023 A1 | 12/2010 | Unrath et al. | |
| 2010/0326962 A1 | 12/2010 | Calla et al. | |
| 2011/0005458 A1 | 1/2011 | Cunningham | |
| 2011/0080476 A1 | 4/2011 | Dinauer et al. | |

(56) References Cited

U.S. PATENT DOCUMENTS

| | | |
|---|---|---|
| 2011/0108533 A1* | 5/2011 | Boettcher ............ B23K 26/042 219/121.72 |
| 2011/0127333 A1 | 6/2011 | Veksland et al. |
| 2011/0127697 A1 | 6/2011 | Milne |
| 2011/0135208 A1 | 6/2011 | Atanassov et al. |
| 2011/0193943 A1 | 8/2011 | Campbell |
| 2011/0286007 A1 | 11/2011 | Pangrazio et al. |
| 2011/0316977 A1 | 12/2011 | Pienaar |
| 2012/0026249 A1 | 2/2012 | Kihira et al. |
| 2012/0035745 A1 | 2/2012 | Mori et al. |
| 2012/0117787 A1 | 5/2012 | Sun et al. |
| 2012/0120232 A1 | 5/2012 | Nishikawa |
| 2012/0197427 A1 | 8/2012 | Gallucci et al. |
| 2012/0293821 A1 | 11/2012 | Chiba |
| 2013/0158957 A1 | 6/2013 | Lee et al. |
| 2013/0178972 A1 | 7/2013 | Goldsmith et al. |
| 2013/0190898 A1* | 7/2013 | Shilpiekandula ...... G05B 19/19 700/19 |
| 2013/0200053 A1 | 8/2013 | Bordatchev |
| 2013/0211391 A1* | 8/2013 | BenYakar ............. A61B 18/20 606/10 |
| 2013/0304248 A1 | 11/2013 | Lange et al. |
| 2014/0005804 A1 | 1/2014 | Brand |
| 2014/0018779 A1 | 1/2014 | Worrell et al. |
| 2014/0039707 A1 | 2/2014 | Curtis et al. |
| 2014/0046131 A1 | 2/2014 | Morita et al. |
| 2014/0071330 A1 | 3/2014 | Zhang et al. |
| 2014/0071502 A1 | 3/2014 | Liu |
| 2014/0160273 A1 | 6/2014 | Jedynak et al. |
| 2014/0168293 A1 | 6/2014 | Moreau et al. |
| 2014/0168302 A1 | 6/2014 | Ngo et al. |
| 2014/0268607 A1 | 9/2014 | Wicker et al. |
| 2014/0299586 A1 | 10/2014 | Sawabe et al. |
| 2014/0310122 A1 | 10/2014 | Danielson et al. |
| 2014/0330424 A1 | 11/2014 | Garaas et al. |
| 2014/0368348 A1 | 12/2014 | Lin |
| 2014/0371895 A1 | 12/2014 | Sadusk et al. |
| 2015/0030821 A1 | 1/2015 | Costin, Sr. et al. |
| 2015/0107033 A1 | 4/2015 | Chang et al. |
| 2015/0108095 A1 | 4/2015 | Kruer et al. |
| 2015/0112470 A1 | 4/2015 | Chang et al. |
| 2015/0127137 A1 | 5/2015 | Brandt et al. |
| 2015/0136949 A1 | 5/2015 | De Nooij et al. |
| 2015/0154453 A1 | 6/2015 | Wilf |
| 2015/0158121 A1 | 6/2015 | Di Cairano et al. |
| 2015/0158311 A1 | 6/2015 | Ogasawara et al. |
| 2015/0197064 A1 | 7/2015 | Walker et al. |
| 2015/0212421 A1* | 7/2015 | deVilliers ........... G03F 7/70425 430/325 |
| 2015/0228069 A1 | 8/2015 | Fresquet et al. |
| 2015/0245549 A1 | 8/2015 | Kurita et al. |
| 2015/0301327 A1 | 10/2015 | Okugawa et al. |
| 2015/0301444 A1* | 10/2015 | Singh ................... G03F 1/00 430/5 |
| 2015/0355621 A1 | 12/2015 | Ikeda et al. |
| 2015/0360318 A1 | 12/2015 | Aubry |
| 2015/0378348 A1 | 12/2015 | Gupta et al. |
| 2016/0023486 A1 | 1/2016 | Priyadarshi |
| 2016/0059371 A1 | 3/2016 | Chang et al. |
| 2016/0084649 A1 | 3/2016 | Yamazaki et al. |
| 2016/0093540 A1 | 3/2016 | Liu et al. |
| 2016/0147213 A1 | 5/2016 | Murakami |
| 2016/0156771 A1 | 6/2016 | Lee |
| 2016/0193698 A1* | 7/2016 | Hildebrand .......... B23K 26/356 219/121.69 |
| 2016/0199945 A1* | 7/2016 | McDowell ............ B23K 26/03 219/121.71 |
| 2016/0210737 A1 | 7/2016 | Straub et al. |
| 2016/0271718 A1 | 9/2016 | Fagan |
| 2016/0303845 A1 | 10/2016 | Arce |
| 2016/0325541 A1* | 11/2016 | Lavrentyev .......... B23K 26/342 |
| 2016/0349038 A1 | 12/2016 | Ohtsuka et al. |
| 2016/0360409 A1 | 12/2016 | Singh |
| 2016/0367336 A1* | 12/2016 | Lv ....................... A61C 1/082 |
| 2016/0368089 A1* | 12/2016 | Grapov ................. G02B 27/40 |
| 2016/0372349 A1* | 12/2016 | Hyakumura ....... B23K 26/0622 |
| 2017/0008127 A1 | 1/2017 | Hyatt et al. |
| 2017/0045877 A1 | 2/2017 | Shapiro et al. |
| 2017/0045879 A1 | 2/2017 | Yang et al. |
| 2017/0051429 A1 | 2/2017 | Sachs et al. |
| 2017/0057008 A1* | 3/2017 | Liu ....................... H04N 7/183 |
| 2017/0123362 A1 | 5/2017 | Masui et al. |
| 2017/0203390 A1 | 7/2017 | Kato |
| 2017/0235293 A1 | 8/2017 | Shapiro et al. |
| 2017/0235294 A1 | 8/2017 | Shapiro et al. |
| 2017/0243374 A1 | 8/2017 | Matsuzawa |
| 2017/0304897 A1* | 10/2017 | Walrand .............. B23K 26/342 |
| 2017/0341183 A1 | 11/2017 | Buller et al. |
| 2018/0001565 A1 | 1/2018 | Hocker |
| 2018/0113434 A1* | 4/2018 | Shapiro ............... G05B 19/406 |
| 2018/0147657 A1* | 5/2018 | Shapiro ................. B32B 37/12 |
| 2018/0147658 A1* | 5/2018 | Shapiro ................. B23K 26/04 |
| 2018/0150047 A1* | 5/2018 | Shapiro ................. G05B 19/19 |
| 2018/0150055 A1* | 5/2018 | Shapiro ................ G06F 21/305 |
| 2018/0150058 A1* | 5/2018 | Shapiro ............... G05B 19/4097 |
| 2018/0150062 A1* | 5/2018 | Shapiro ............... G05B 19/4093 |
| 2018/0311762 A1* | 11/2018 | Van Der Stam ..... B23K 26/032 |
| 2018/0369964 A1* | 12/2018 | Grapov ............. B23K 26/1462 |
| 2019/0014307 A1 | 1/2019 | McNamer et al. |
| 2019/0058870 A1 | 2/2019 | Rowell et al. |
| 2019/0148028 A1* | 5/2019 | Ravenhall .............. G21K 1/006 250/251 |
| 2019/0232357 A1* | 8/2019 | Angerer ................. F16P 3/144 |
| 2019/0278250 A1 | 9/2019 | Clement et al. |
| 2019/0310604 A1 | 10/2019 | Shapiro et al. |
| 2019/0383727 A1* | 12/2019 | Stewart ............... B23K 26/064 |
| 2020/0039002 A1 | 2/2020 | Sercel et al. |
| 2020/0056938 A1* | 2/2020 | Barkhurst ............ G02B 7/1822 |
| 2020/0064806 A1 | 2/2020 | Shapiro et al. |
| 2020/0073362 A1 | 3/2020 | Shapiro et al. |
| 2020/0086424 A1* | 3/2020 | Jones ...................... B22F 12/00 |
| 2020/0089184 A1 | 3/2020 | Shapiro et al. |
| 2020/0089185 A1 | 3/2020 | Shapiro et al. |
| 2020/0125071 A1 | 4/2020 | Shapiro et al. |
| 2020/0150544 A1* | 5/2020 | Prochnau ............ G03F 7/70141 |
| 2020/0192332 A1 | 6/2020 | Jacobs et al. |
| 2020/0398457 A1 | 12/2020 | Zhang et al. |
| 2021/0007901 A1* | 1/2021 | Piantoni ............ A61F 13/15764 |
| 2021/0010803 A1* | 1/2021 | Okuma ..................... G01C 3/06 |
| 2021/0026252 A1* | 1/2021 | Treubel ............... G03F 7/70525 |
| 2021/0046546 A1* | 2/2021 | Madigan ................ B29C 64/00 |
| 2021/0060698 A1* | 3/2021 | Inoue ................. B23K 26/0665 |
| 2021/0063712 A1* | 3/2021 | Lambert ............. G02B 17/0605 |
| 2021/0066082 A1* | 3/2021 | Ito ..................... H01L 29/78603 |
| 2021/0075180 A1* | 3/2021 | Hudek .................. H01S 3/0014 |
| 2021/0078103 A1* | 3/2021 | von der Heydt ...... B23K 26/24 |
| 2021/0094127 A1* | 4/2021 | Sercel ................ B23K 26/0876 |
| 2021/0094128 A1* | 4/2021 | Nomaru ............... B23K 26/032 |
| 2021/0101228 A1* | 4/2021 | Sbetti ..................... G01M 11/02 |
| 2021/0197313 A1* | 7/2021 | Onoda ................ B23K 26/0665 |
| 2021/0323071 A1* | 10/2021 | Mark ...................... B22F 10/12 |
| 2021/0341281 A1* | 11/2021 | Schumann ........... G01B 11/026 |
| 2021/0354245 A1* | 11/2021 | Kang ..................... B23K 26/38 |

FOREIGN PATENT DOCUMENTS

| | | |
|---|---|---|
| CN | 101837517 A | 9/2010 |
| CN | 205958834 U | 2/2017 |
| CN | 106670656 A | 5/2017 |
| DE | 10 2014 214058 A1 | 1/2016 |
| EP | 0 050 425 A2 | 4/1982 |
| EP | 0954125 A2 | 11/1999 |
| EP | 1309108 A1 | 5/2003 |
| EP | 1 645 925 A1 | 4/2006 |
| EP | 2471625 A2 | 7/2012 |
| EP | 2808123 A1 | 12/2014 |
| FR | 2748562 A1 | 11/1997 |
| JP | H03 254380 A | 11/1991 |
| JP | 04244347 A | 9/1992 |
| JP | H05-205051 A | 8/1993 |
| JP | H06-196557 A | 7/1994 |
| JP | 2001-330413 A | 11/2001 |
| JP | 2002123306 A | 4/2002 |

(56) References Cited

FOREIGN PATENT DOCUMENTS

| JP | 2006-187782 A | 7/2006 |
|---|---|---|
| JP | 2006-329751 A | 12/2006 |
| JP | 2008-119718 A | 5/2008 |
| JP | 4311856 B2 | 8/2009 |
| WO | WO-94/03302 A1 | 2/1994 |
| WO | WO-96/23240 A1 | 8/1996 |
| WO | WO-01/076250 A1 | 10/2001 |
| WO | WO-2016/131019 A1 | 8/2016 |
| WO | WO-2016/131022 A1 | 8/2016 |

OTHER PUBLICATIONS

Gao, Rong et al. "Human-Machine Collaborative Workshop Digital Manufacturing." *ICICTA. 2010 IEEE*. May 11, 2010. pp. 445-448.
Examination Report issued in European Patent Application No. 16709185.9, dated Jul. 1, 2020 (Jul. 1, 2020). 5 pages.
First Office Action issued in Chinese Patent Application No. 201680021337.8, dated Apr. 10, 2019. 6 pages. [Chinese language].
First Office Action issued in Chinese Patent Application No. 201680021337.8, dated Apr. 10, 2019. 8 pages. [English language translation].
Inmagine Group. Vectr Free Online Vector Graphics Software. Retrieved Mar. 22, 2021, from https://vectr.com/. 3 pages.
International Search Report and Written Opinion issued in International Application No. PCT/US2016/017900, dated May 27, 2016. 16 pages.
International Search Report and Written Opinion issued in International Application No. PCT/US2016/017901, dated Jun. 3, 2016 (Jun. 3, 2016). 13 pages.
International Search Report and Written Opinion issued in International Application No. PCT/US2016/017903, dated Jun. 1, 2016. 15 pages.
International Search Report and Written Opinion issued in International Application No. PCT/US2016/017904, dated May 23, 2016. (May 23, 2016). 19 pages.
International Search Report and Written Opinion issued in International Application No. PCT/US2017/063187, dated Apr. 3, 2018 (Apr. 3, 2018). 11 pages.
International Search Report and Written Opinion issued in International Application No. PCT/US2017/063188, dated Feb. 16, 2018 (Feb. 16, 2018). 14 pages.
International Search Report and Written Opinion issued in International Application No. PCT/US2017/063189, dated May 2, 2018 (May 2, 2018). 22 pages.
International Search Report and Written Opinion issued in International Application No. PCT/US2017/063190, dated May 3, 2018 (May 3, 2018). 18 pages.
International Search Report and Written Opinion issued in International Application No. PCT/US2017/063191, dated Mar. 21, 2018 (Mar. 21, 2018). 12 pages.
International Search Report and Written Opinion issued in International Application No. PCT/US2017/063193, dated Feb. 16, 2018 (Feb. 16, 2018). 12 pages.
Second Office Action issued in Chinese Patent Application No. 201680021337.8, dated Nov. 4, 2019. 3 pages. [Chinese language].
Second Office Action issued in Chinese Patent Application No. 201680021337.8, dated Nov. 4, 2019. 4 pages. [English language translation].
Third Office Action issued in Chinese Patent Application No. 201680021337.8, dated Jul. 23, 2020. 11 pages. [Chinese language].
Third Office Action issued in Chinese Patent Application No. 201680021337.8, dated Jul. 23, 2020. 20 pages. [English language translation].
International Search Report and Written Opinion issued in International Application No. PCT/US2017/063192, dated Apr. 19, 2018 (Apr. 19, 2018). 12 pages.
Barbosa, W. et. al. (Jan. 1, 2012), "Samba Reception Desk: Compromising Aesthetics, Fabrication and Structural Performance in the Design Process,", Digital Aids to Design Creativity, vol. 2, eCAADe 30, pp. 245-254. XP055844557, Retrieved from the Internet:URL:http://papers.cumincad.org/data/works/att/ecaade2012_163.content.pdf [retrieved on Sep. 24, 2021].
Extended European Search Report issued in European Patent Application No. 21180624.5, dated Oct. 7, 2021 (Oct. 7, 2021). 13 pages.
Extended European Search Report issued in European Patent Application No. 21182408.1, dated Oct. 8, 2021 (Oct. 8, 2021). 14 pages.
Hartmann, M. et al. (Feb. 27, 2014) "CutCAD User Guide", 71 pages, XP055844537, Retrieved from the Internet: URL:https://hci.rwth-aachen.de/index.php?option=com_attachments&task-download&id=2059 [retrieved on Sep. 24, 2021].
Hattuniemi, J.M. (2009). "A calibration method of triangulation sensors for thickness measurement." 2009 IEEE Instrumentation and Measurement Technology Conference, (I2MTC) May 5-7, 2009 Singapore, Singapore, IEEE, Picataway, NJ, USA, 566-569. XP031492700, ISBN: 978-1-4244-3352-0.
Office Action issued in European Patent Application No. 16709185.9, dated Oct. 27, 2021 (Oct. 27, 2021). 5 pages.
Robertson, D. et al. (Sep. 1991), "CAD and Cognitive Complexity: Beyond the Drafting Board Metaphor," Manufacturing Review, American Society of Mechanical Engineers, New York, US, vol. 4, No. 3, pp. 194-204, XP000233200,ISSN: 0896-1611.
Sass, L. (2007), "Synthesis of design production with integrated digital fabrication", Automation In Construction, Elsevier, Amsterdam, NL, vol. 16, No. 3, Feb. 7, 2007, pp. 298-310, XP005877992,ISSN: 0926-5805, DOI: 10.1016/J.AUTCON.2006.06.002.
Sliwinski, P. (2013). "A Simple Model for On-Sensor Phase-Detection Autofocusing Algorithm." Journal of Computer and Communications, vol. 1, No. 6, pp. 11-17. doi: 10.4236/jcc.2013.16003, ISSN: 2327-5219.

\* cited by examiner ions, a wireless wide area network, a local area network, a wide area network, a wired network, or the like), via a direct connection between one or more of the multiple computing systems, etc.

PRESET OPTICAL COMPONENTS IN A COMPUTER NUMERICALLY CONTROLLED MACHINE

CROSS REFERENCE TO RELATED APPLICATION

This application claims priority to U.S. Provisional Patent Application No. 62/426,438 filed on Nov. 25, 2016 and entitled PRESET OPTICAL COMPONENTS IN A CNC MACHINE, the disclosure of which is incorporated herein by reference in its entirety.

TECHNICAL FIELD

The subject matter described herein relates to an optical system constructed with optical components that resist misalignment by an end user.

BACKGROUND

Optical systems, for example laser-based, computer numerically controlled (CNC) machines, can include one or more optical elements to guide or focus a laser beam. The orientation and optical components can determine where the laser is directed to and the degree to which the laser is focused. In some configurations, optical systems can be adjustable, either by a user or by virtue of their construction.

SUMMARY

In one aspect, a system includes a moveable head of a computer numerically controlled machine configured to deliver electromagnetic energy sufficient to cause a change in a material at least partially contained within an interior space of the computer numerically controlled machine. The system also includes optical elements in the computer numerically controlled machine. The optical elements are oriented at a fixed angle to each other to deliver the electromagnetic energy from a laser to the material.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. Fixed optical components can prevent or reduce misalignment of an optical system, for example, during shipping or assembly. Also, fixed optical components can sometimes prevent or reduce an unintentional misalignment by a user, for example, during system setup or during use.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to preset optical components in a CNC machine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
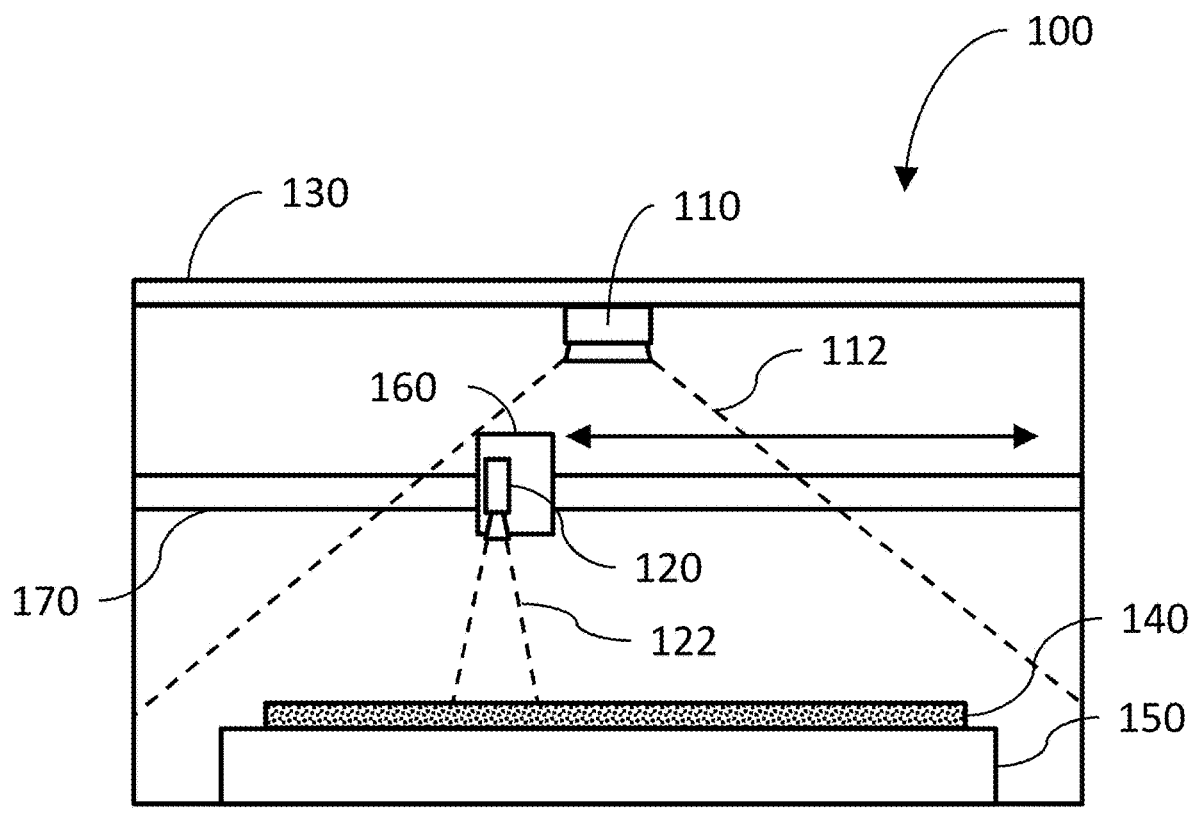
FIG. 1 is an elevational view of a CNC machine with a camera positioned to capture an image of the entire material bed and another camera positioned to capture an image of a portion of the material bed, consistent with some implementations of the current subject matter.
Figure 1:
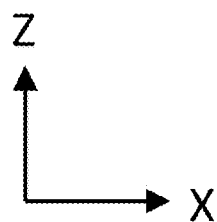

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to using machine-vision for aiding automated manufacturing processes (e.g. a CNC process), it should be readily understood that such features are not intended to be limiting.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a CNC machine modifies the appearance of the material without fully penetrating it. For example, in the context of a laser cutter, it can mean removing some of the material from the surface, or discoloring the material e.g. through an application of focused electromagnetic radiation delivering electromagnetic energy as described below.

As used herein, the term "laser" includes any electromagnetic radiation or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared radiation far from the visible spectrum such as microwaves, X-rays, or gamma rays, optically filtered detectors, spectrometers, and other detectors that can include sources providing electromagnetic radiation for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the CNC machine. For example, if the CNC machine is a laser cutter, lathe, or milling machine, the material is what is placed in the CNC machine to be cut, for example, the raw materials, stock, or the like. In another example, if the CNC machine is a 3-D printer, then the material is either the current layer, or previously existent layers or substrate, of an object being crafted by the 3-D printing process. In yet another example, if the CNC machine is a printer, then the material can be the paper onto which the CNC machine deposits ink.

Introduction

A computer numerical controlled (CNC) machine is a machine that is used to add or remove material under the control of a computer. There can be one or more motors or other actuators that move one or more heads that perform the adding or removing of material. For CNC machines that add material, heads can incorporate nozzles that spray or release polymers as in a typical 3D printer. In some implementations, the heads can include an ink source such as a cartridge or pen. In the case of 3-D printing, material can be built up layer by layer until a fully realized 3D object has been created. In some implementations, the CNC machine can scan the surface of a material such as a solid, a liquid, or a powder, with a laser to harden or otherwise change the material properties of said material. New material may be deposited. The process can be repeated to build successive layers. For CNC machines that remove material, the heads can incorporate tools such as blades on a lathe, drag knives, plasma cutters, water jets, bits for a milling machine, a laser for a laser cutter/engraver, etc.

Figure 2:
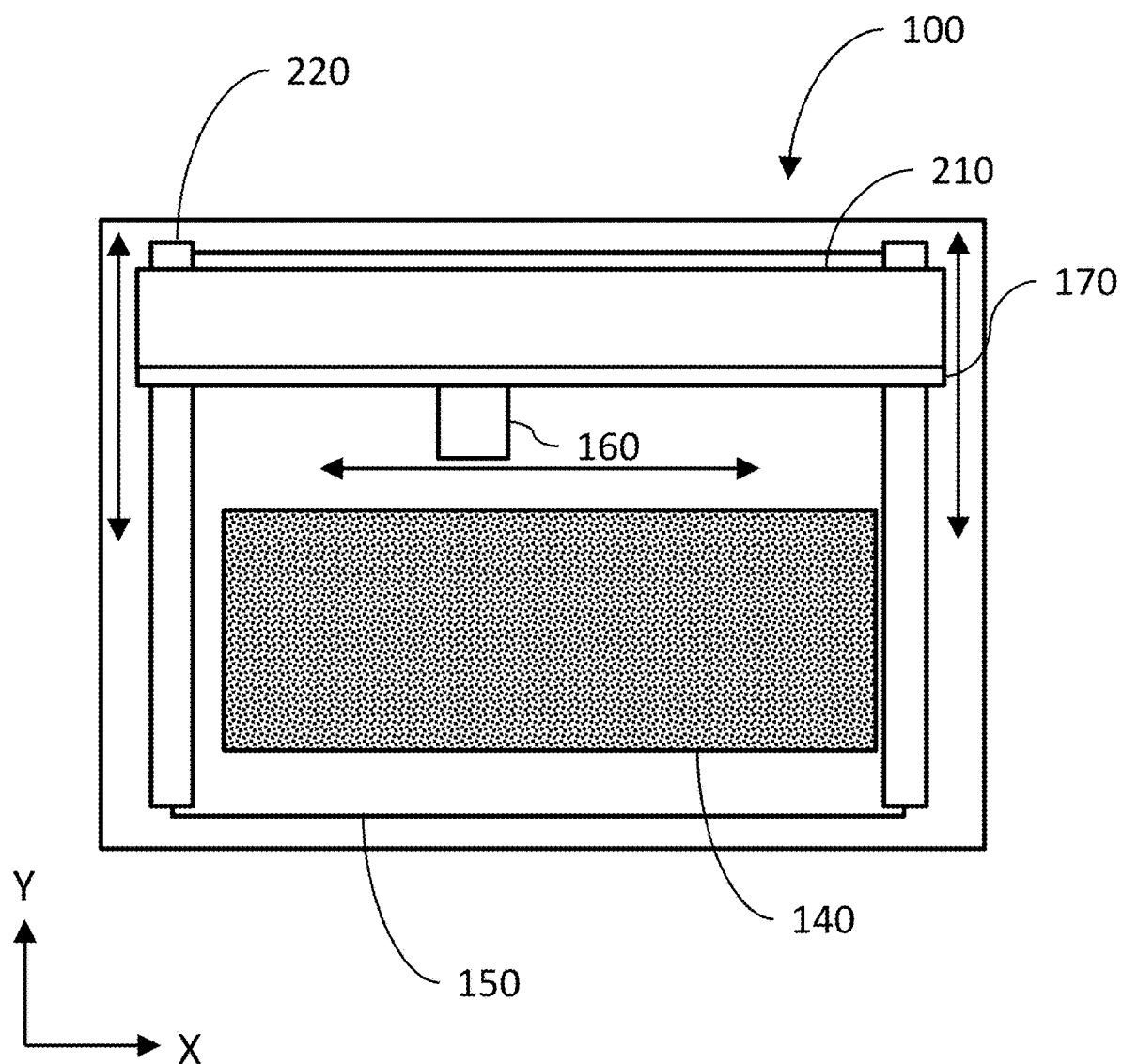
FIG. 2 is a top view of the implementation of the CNC machine shown in FIG. 1.

FIG. 1 is an elevational view of a CNC machine 100 with a camera positioned to capture an image of an entire material bed 150 and another camera positioned to capture an image of a portion of the material bed 150, consistent with some implementations of the current subject matter. FIG. 2 is a top view of the implementation of the CNC machine 100 shown in FIG. 1.

The CNC machine 100 shown in FIG. 1 corresponds to one implementation of a laser cutter. While some features are described in the context of a laser cutter, this is by no means intended to be limiting. Many of the features described below can be implemented with other types of CNC machines. The CNC machine 100 can be, for example, a lathe, engraver, 3D-printer, milling machine, drill press, saw, etc.

While laser cutter/engravers share some common features with CNC machines, they have many differences and present particularly challenging design constraints. A laser cutter/engraver is subject to regulatory guidelines that restrict the egress of electromagnetic radiation from the unit when operating, making it challenging for light to enter or escape the unit safely, for example to view or record an image of the contents.

The beam of a laser cutter/engraver must be routed from the emitter to the area to be machined, potentially requiring a series of optical elements such as lenses and mirrors. A variety of optical elements and configurations may give rise to the desired size, shape and other considerations of the machining work area, and more broadly CNC machine function.

The beam of a laser cutter/engraver is easily misdirected, with a small angular deflection of any component relating to the beam path potentially resulting in the beam escaping the intended path, potentially with undesirable consequences.

A laser beam may be capable of causing material destruction if uncontrolled. A laser cutter/engraver may require high voltage and/or radio frequency power supplies to drive the laser itself. Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object. Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

The CNC machine 100 can have a housing surrounding an enclosure or interior area defined by the housing. The housing can include walls, a bottom, and one or more openings to allow access to the CNC machine 100, etc. There can be a material bed 150 that can include a top surface on which the material 140 generally rests.

In the implementation of FIG. 1, the CNC machine can also include an openable barrier as part of the housing to allow access between an exterior of the CNC machine and an interior space of the CNC machine. The openable barrier can include, for example, one or more doors, hatches, flaps, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure. Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the CNC machine 100. These access points can be for access to power, air, water, data, etc. Any of these access points can be monitored by cameras, position sensors, switches, etc. If they are accessed unexpectedly, the CNC machine 100 can execute actions to maintain the safety of the user and the system, for example, a controlled shutdown. In other implementations, the CNC machine 100 can be completely open (i.e. not having a lid 130, or walls). Any of the features described herein can also be present in an open configuration, where applicable.

As described above, the CNC machine 100 can have one or more movable heads that can be operated to alter the material 140. In some implementations, for example the implementation of FIG. 1, the movable head can be the head 160. There may be multiple movable heads, for example two or more mirrors that separately translate or rotate in able to locate a laser beam, or multiple movable heads that operate independently, for example two mill bits in a CNC machine capable of separate operation, or any combination thereof. In the case of a laser-cutter CNC machine, the head 160 can include optical components, mirrors, cameras, and other electronic components used to perform the desired machining operations. Again, as used herein, the head 160 typically is a laser-cutting head, but can be a movable head of any type.

The head 160, in some implementations, can be configured to include a combination of optics, electronics, and mechanical systems that can, in response to commands, cause a laser beam or electromagnetic radiation to be delivered to cut or engrave the material 140. The CNC machine 100 can also execute operation of a motion plan for causing movement of the movable head. As the movable head moves, the movable head can deliver electromagnetic energy to effect a change in the material 140 that is at least partially contained within the interior space. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head can be linear, for example on an X axis, a Y axis, or a Z axis. In other implementations, the head can combine motions along any combination of directions in a rectilinear, cylindrical, or spherical coordinate system.

A working area for the CNC machine 100 can be defined by the limits within which the movable head can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the CNC machine, that 400 in$^2$ volume can be considered to be the working area. Restated, the working area can be defined by the extents of positions in which material 140 can be worked by the CNC machine 100, and not necessarily tied or limited by the travel of any one component. For example, if the head 160 could turn at an angle, then the working area could extend in some direction beyond the travel of the head 160. By this definition, the working area can also include any surface, or portion thereof, of any material 140 placed in the CNC machine 100 that is at least partially within the working area, if that surface can be worked by the CNC machine 100. Similarly, for oversized material, which may extend even outside the CNC machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the CNC machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the CNC machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the CNC machine 100 while an openable barrier, for example the lid 130, is in the open state (e.g. not in a closed state). The reverse can be true as well, meaning that some functions of the CNC machine 100 can be prevented while in a closed state. There can also be interlocks in series where, for example, the CNC machine 100 will not operate unless both the lid 130 and the front door are both closed. Furthermore, some components of the CNC machine 100 can be tied to states of other components of the CNC machine, such as not allowing the lid 130 to open while the laser is on, a movable component moving, a motor running, sensors detecting a certain gas, etc. In some implementations, the interlock can prevent emission of electromagnetic energy from the movable head when detecting that the openable barrier is not in the closed position.

Converting Source Files to Motion Plans

A traditional CNC machine accepts a user drawing, acting as a source file that describes the object the user wants to create or the cuts that a user wishes to make. Examples of source files are:

1) .STL files that define a three-dimensional object that can be fabricated with a 3D printer or carved with a milling machine, 2) .SVG files that define a set of vector shapes that can be used to cut or draw on material, 3) .JPG files that define a bitmap that can be engraved on a surface, and 4) CAD files or other drawing files that can be interpreted to describe the object or operations similarly to any of the examples above.

Figures 3A, 3B, 3C:
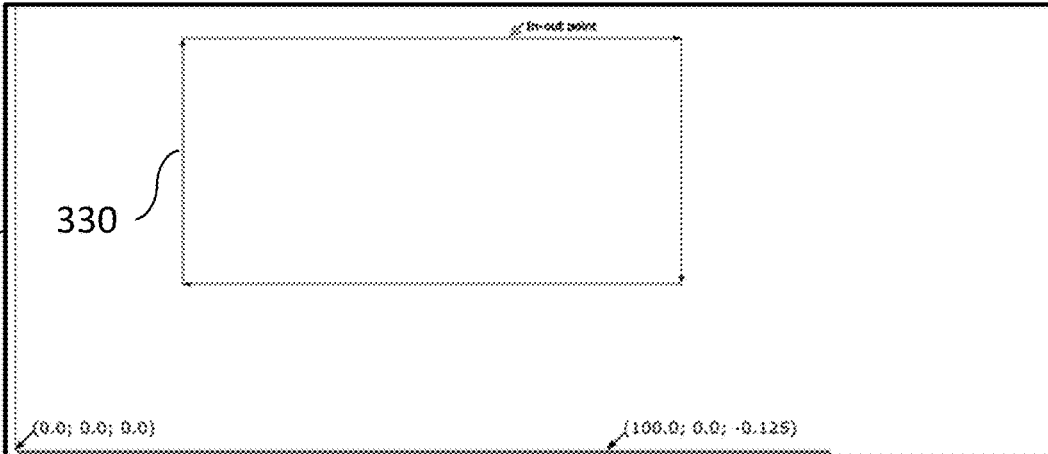
FIG. 3A is a diagram illustrating one example of an SVG source file, consistent with some implementations of the current subject matter.
FIG. 3B is an example of a graphical representation of the cut path in the CNC machine, consistent with some implementations of the current subject matter.
FIG. 3C is a diagram illustrating the machine file corresponding to the cut path and the source file, consistent with some implementations of the current subject matter.

FIG. 3A is a diagram illustrating one example of an SVG source file 310, consistent with some implementations of the current subject matter. FIG. 3B is an example of a graphical representation 320 of the cut path 330 in the CNC machine, consistent with some implementations of the current subject matter. FIG. 3C is a diagram illustrating the machine file 340 that would result in a machine creating the cut path 330, created from the source file 310, consistent with some implementations of the current subject matter. The example source file 310 represents a work surface that is 640×480 units with a 300×150 unit rectangle whose top left corner is located 100 units to the right and 100 units down from the top-left corner of the work surface. A computer program can then convert the source file 310 into a machine file 340 that can be interpreted by the CNC machine 100 to take the actions illustrated in FIG. 3B. The conversion can take place on a local computer where the source files reside on the CNC machine 100, etc.

The machine file 340 describes the idealized motion of the CNC machine 100 to achieve the desired outcome. Take, for example, a 3D printer that deposits a tube-shaped string of plastic material. If the source file specifies a rectangle then the machine file can instruct the CNC machine to move along a snakelike path that forms a filled in rectangle, while extruding plastic. The machine file can omit some information, as well. For example, the height of the rectangle may no longer be directly present in the machine file; the height will be as tall as the plastic tube is high. The machine file can also add some information. For example, the instruction to move the print head from its home position to a corner of the rectangle to begin printing. The instructions can even depart from the directly expressed intent of the user. A common setting in 3D printers, for example, causes solid shapes to be rendered as hollow in the machine file to save on material cost.

As shown by the example of FIGS. 3A-C, the conversion of the source file 310 to the machine file 330 can cause the CNC machine to move the cutting tool from (0,0) (in FIG. 3B) to the point at which cutting is to begin, activate the cutting tool (for example lower a drag knife or energize a laser), trace the rectangle, deactivate the cutting tool, and return to (0,0).

Once the machine file has been created, a motion plan for the CNC machine 100 can be generated. The motion plan contains the data that determines the actions of components of the CNC machine 100 at different points in time. The motion plan can be generated on the CNC machine 100 itself or by another computing system. A motion plan can be a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, motion plans are defined by the presence of a temporal element, either explicit or inferred, indicating the time or time offset at which each action should occur. This allows for one of the key functions of a motion plan, coordinated motion, wherein multiple actuators coordinate to have a single, pre-planned affect.

The motion plan renders the abstract, idealized machine file as a practical series of electrical and mechanical tasks. For example, a machine file might include the instruction to "move one inch to the right at a speed of one inch per second, while maintaining a constant number of revolutions per second of a cutting tool." The motion plan must take into consideration that the motors cannot accelerate instantly, and instead must "spin up" at the start of motion and "spin down" at the end of motion. The motion plan would then specify pulses (e.g. sent to stepper motors or other apparatus for moving the head or other parts of a CNC machine) occurring slowly at first, then faster, then more slowly again near the end of the motion.

The machine file is converted to the motion plan by the motion controller/planner. Physically, the motion controller can be a general or special purpose computing device, such as a high performance microcontroller or single board computer coupled to a Digital Signal Processor (DSP). The job of the motion controller is to take the vector machine code and convert it into electrical signals that will be used to drive the motors on the CNC machine 100, taking in to account the exact state of the CNC machine 100 at that moment (e.g. "since the machine is not yet moving, maximum torque must be applied, and the resulting change in speed will be small") and physical limitations of the machine (e.g. accelerate to such-and-such speed, without generating forces in excess of those allowed by the machine's design). The signals can be step and direction pulses fed to stepper motors or location signals fed to servomotors among other possibilities, which create the motion and actions of the CNC machine 100, including the operation of elements like actuation of the head 160, moderation of heating and cooling, and other operations. In some implementations, a compressed file of electrical signals can be decompressed and then directly output to the motors. These electrical signals can include binary instructions similar to 1's and 0's to indicate the electrical power that is applied to each input of each motor over time to effect the desired motion.

In the most common implementation, the motion plan is the only stage that understands the detailed physics of the CNC machine 100 itself, and translates the idealized machine file into implementable steps. For example, a particular CNC machine 100 might have a heavier head, and require more gradual acceleration. This limitation is modeled in the motion planner and affects the motion plan. Each model of CNC machine can require precise tuning of the motion plan based on its measured attributes (e.g. motor torque) and observed behavior (e.g. belt skips when accelerating too quickly). The CNC machine 100 can also tune the motion plan on a per-machine basis to account for variations from CNC machine to CNC machine.

The motion plan can be generated and fed to the output devices in real-time, or nearly so. The motion plan can also be pre-computed and written to a file instead of streamed to a CNC machine, and then read back from the file and transmitted to the CNC machine 100 at a later time. Transmission of instructions to the CNC machine 100, for example, portions of the machine file or motion plan, can be streamed as a whole or in batches from the computing system storing the motion plan. Batches can be stored and managed separately, allowing pre-computation or additional optimization to be performed on only part of the motion plan. In some implementations, a file of electrical signals, which may be compressed to preserve space and decompressed to facilitate use, can be directly output to the motors. The electrical signals can include binary instructions similar to 1's and 0's to indicate actuation of the motor.

The motion plan can be augmented, either by precomputing in advance or updating in real-time, with the aid of machine vision. Machine vision is a general term that describes the use of sensor data, and not only limited to optical data, in order to provide additional input to machine operation. Other forms of input can include, for example, audio data from an on-board sound sensor such as a microphone, or position/acceleration/vibration data from an on-board sensor such as a gyroscope or accelerometer. Machine vision can be implemented by using cameras to provide images of, for example, the CNC machine 100, the material being operated on by the CNC machine, the environment of the CNC machine 100 (if there is debris accumulating or smoke present), or any combination of these. These cameras can then route their output to a computer for processing. By viewing the CNC machine 100 in operation and analyzing the image data it can, for example, be determined if the CNC machine 100 is working correctly, if the CNC machine 100 is performing optimally, the current status of the CNC machine 100 or subcomponents of the CNC machine 100, etc. Similarly, the material can be imaged and, for example, the operation of the CNC machine 100 can be adjusted according to instructions, users can be notified when the project is complete, or information about the material can be determined from the image data. Error conditions can be identified, such as if a foreign body has been inadvertently left in the CNC machine 100, the material has been inadequately secured, or the material is reacting in an unexpected way during machining.

Camera Systems

Cameras can be mounted inside the CNC machine 100 to acquire image data during operation of the CNC machine 100. Image data refers to all data gathered from a camera or image sensor, including still images, streams of images, video, audio, metadata such as shutter speed and aperture settings, settings or data from or pertaining to a flash or other auxiliary information, graphic overlays of data superimposed upon the image such as GPS coordinates, in any format, including but not limited to raw sensor data such as a .DNG file, processed image data such as a .JPG file, and data resulting from the analysis of image data processed on the camera unit such as direction and velocity from an optical mouse sensor. For example, there can be cameras mounted such that they gather image data from (also referred to as 'view' or 'image') an interior portion of the CNC machine 100. The viewing can occur when the lid 130 is in a closed position or in an open position or independently of the position of the lid 130. In one implementation, one or more cameras, for example a camera mounted to the interior surface of the lid 130 or elsewhere within the case or enclosure, can view the interior portion when the lid 130 to the CNC machine 100 is a closed position. In particular, in some preferred embodiments, the cameras can image the material 140 while the CNC machine 100 is closed and, for example, while machining the material 140. In some implementations, cameras can be mounted within the interior space and opposite the working area. In other implementations, there can be a single camera or multiple cameras attached to the lid 130. Cameras can also be capable of motion such as translation to a plurality of positions, rotation, and/or tilting along one or more axes. One or more cameras mounted to a translatable support, such as a gantry 210, which can be any mechanical system that can be commanded to move (movement being understood to include rotation) the camera or a mechanism such as a mirror that can redirect the view of the camera, to different locations and view different regions of the CNC machine. The head 160 is a special case of the translatable support, where the head 160 is limited by the track 220 and the translation rail 170 that constrain its motion.

Lenses can be chosen for wide angle coverage, for extreme depth of field so that both near and far objects may be in focus, or many other considerations. The cameras may be placed to additionally capture the user so as to document the building process, or placed in a location where the user can move the camera, for example on the underside of the lid 130 where opening the CNC machine 100 causes the camera to point at the user. Here, for example, the single camera described above can take an image when the lid is not in the closed position. Such an image can include an object, such as a user, that is outside the CNC machine 100. Cameras can be mounted on movable locations like the head 160 or lid 130 with the intention of using video or multiple still images taken while the camera is moving to assemble a larger image, for example scanning the camera across the material 140 to get an image of the material 140 in its totality so that the analysis of image data may span more than one image.

As shown in FIG. 1, a lid camera 110, or multiple lid cameras, can be mounted to the lid 130. In particular, as shown in FIG. 1, the lid camera 110 can be mounted to the underside of the lid 130. The lid camera 110 can be a camera with a wide field of view 112 that can image a first portion of the material 140. This can include a large fraction of the material 140 and the material bed or even all of the material 140 and material bed 150. The lid camera 110 can also image the position of the head 160, if the head 160 is within the field of view of the lid camera 110. Mounting the lid camera 110 on the underside of the lid 130 allows for the user to be in view when the lid 130 is open. This can, for example, provide images of the user loading or unloading the material 140, or retrieving a finished project. Here, a number of sub-images, possibly acquired at a number of different locations, can be assembled, potentially along with other data like a source file such as an SVG or digitally rendered text, to provide a final image. When the lid 130 is closed, the lid camera 110 rotates down with the lid 130 and brings the material 140 into view.

Also as shown in FIG. 1, a head camera 120 can be mounted to the head 160. The head camera 120 can have a narrower field of view 122 and take higher resolution images of a smaller area, of the material 140 and the material bed, than the lid camera 110. One use of the head camera 120 can be to image the cut made in the material 140. The head camera 120 can identify the location of the material 140 more precisely than possible with the lid camera 110.

Other locations for cameras can include, for example, on an optical system guiding a laser for laser cutting, on the laser itself, inside a housing surrounding the head 160, underneath or inside of the material bed 150, in an air filter or associated ducting, etc. Cameras can also be mounted outside the CNC machine 100 to view users or view external features of the CNC machine 100.

Multiple cameras can also work in concert to provide a view of an object or material 140 from multiple locations, angles, resolutions, etc. For example, the lid camera 110 can identify the approximate location of a feature in the CNC machine 100. The CNC machine 100 can then instruct the head 160 to move to that location so that the head camera 120 can image the feature in more detail.

While the examples herein are primarily drawn to a laser cutter, the use of the cameras for machine vision in this application is not limited to only that specific type of CNC machine 100. For example, if the CNC machine 100 were a lathe, the lid camera 110 can be mounted nearby to view the rotating material 140 and the head 160, and the head camera 120 located near the cutting tool. Similarly, if the CNC machine 100 were a 3D printer, the head camera 120 can be mounted on the head 160 that deposits material 140 for forming the desired piece.

An image recognition program can identify conditions in the interior portion of the CNC machine 100 from the acquired image data. The conditions that can be identified are described at length below, but can include positions and properties of the material 140, the positions of components of the CNC machine 100, errors in operation, etc. Based in part on the acquired image data, instructions for the CNC machine 100 can be created or updated. The instructions can, for example, act to counteract or mitigate an undesirable condition identified from the image data. The instructions can include changing the output of the head 160. For example, for a CNC machine 100 that is a laser cutter, the laser can be instructed to reduce or increase power or turn off. Also, the updated instructions can include different parameters for motion plan calculation, or making changes to an existing motion plan, which could change the motion of the head 160 or the gantry 210. For example, if the image indicates that a recent cut was offset from its desired location by a certain amount, for example due to a part moving out of alignment, the motion plan can be calculated with an equal and opposite offset to counteract the problem, for example for a second subsequent operation or for all future operations. The CNC machine 100 can execute the instructions to create the motion plan or otherwise effect the changes described above. In some implementations, the movable component can be the gantry 210, the head 160, or an identifiable mark on the head 160. The movable component, for example the gantry 210, can have a fixed spatial relationship to the movable head. The image data can update software controlling operation of the CNC machine 100 with a position of the movable head and/or the movable component with their position and/or any higher order derivative thereof.

Because the type of image data required can vary, and/or because of possible limitations as to the field of view of any individual camera, multiple cameras can be placed throughout the CNC machine 100 to provide the needed image data. Camera choice and placement can be optimized for many use cases. Cameras closer to the material 140 can be used for detail at the expense of a wide field of view. Multiple cameras may be placed adjacently so that images produced by the multiple cameras can be analyzed by the computer to achieve higher resolution or wider coverage jointly than was possible for any image individually. The manipulation and improvement of images can include, for example, stitching of images to create a larger image, adding images to increase brightness, differencing images to isolate changes (such as moving objects or changing lighting), multiplying or dividing images, averaging images, rotating images, scaling images, sharpening images, and so on, in any combination. Further, the system may record additional data to assist in the manipulation and improvement of images, such as recordings from ambient light sensors and location of movable components. Specifically, stitching can include taking one or more sub-images from one or more cameras and combining them to form a larger image. Some portions of the images can overlap as a result of the stitching process. Other images may need to be rotated, trimmed, or otherwise manipulated to provide a consistent and seamless larger image as a result of the stitching. Lighting artifacts such as glare, reflection, and the like, can be reduced or eliminated by any of the above methods. Also, the image analysis program can performing edge detection and noise reduction or elimination on the acquired images. Edge detection can include performing contrast comparisons of different parts of the image to detect edges and identify objects or features in the image. Noise reduction can involve averaging or smoothing of one or more images to reduce the contribution of periodic, random, or pseudo-random image noise, for example that due to CNC machine 100 operation such as vibrating fans, motors, etc.

Figure 4A:
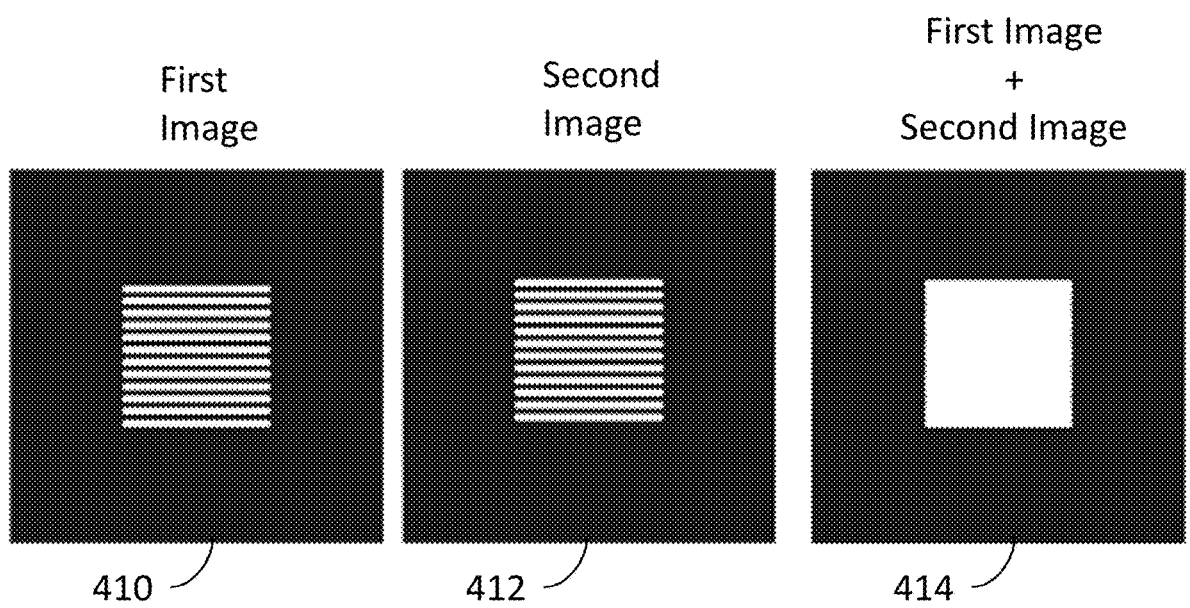
FIG. 4A is a diagram illustrating the addition of images, consistent with some implementations of the current subject matter.

FIG. 4A is a diagram illustrating the addition of images, consistent with some implementations of the current subject matter. Images taken by the cameras can be added, for example, to increase the brightness of an image. In the example of FIG. 4A, there is a first image 410, a second image 412, and a third image 414. First image 410 has horizontal bands (shown in white against a black background in the figure). The horizontal bands can conform to a more brightly lit object, though the main point is that there is a difference between the bands and the background. Second image 412 has similar horizontal bands, but offset in the vertical direction relative to those in the first image 410. When the first image 410 and second image 412 are added, their sum is shown in by the third image 414. Here, the two sets of bands interleave to fill in the bright square as shown. This technique can be applied to, for example, acquiring many image frames from the cameras, possibly in low light conditions, and adding them together to form a brighter image.

Figure 4B:
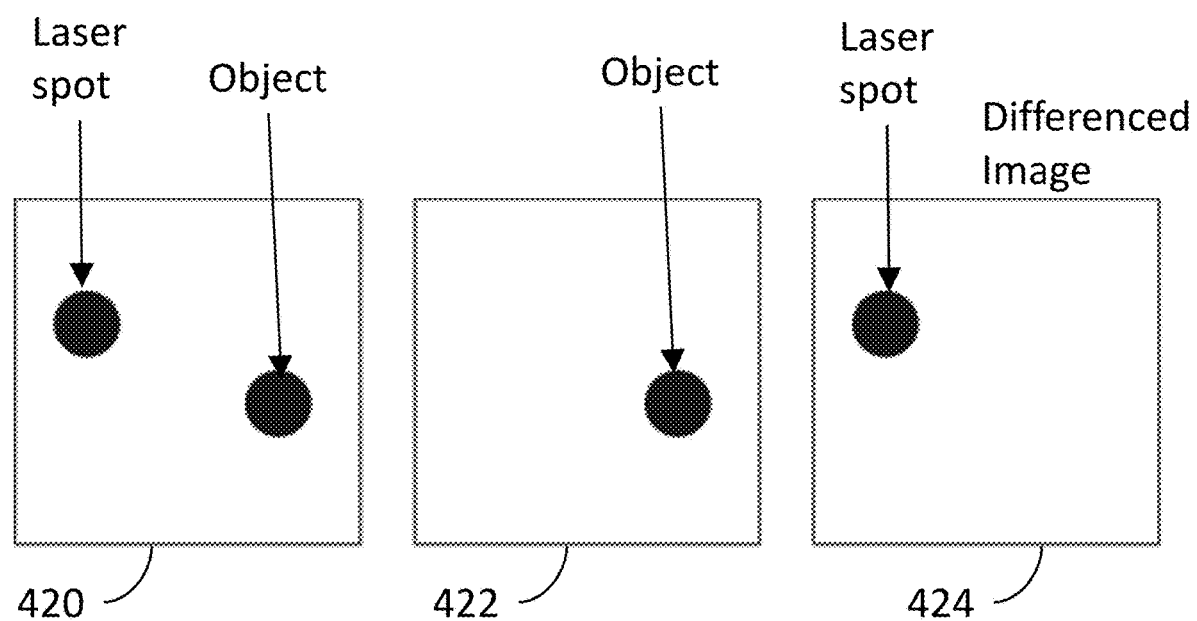
FIG. 4B is a diagram illustrating the subtraction of images, consistent with some implementations of the current subject matter.

FIG. 4B is a diagram illustrating the subtraction of images, consistent with some implementations of the current subject matter. Image subtraction can be useful to, for example, isolate dim laser spot from a comparatively bright image. Here, a first image 420 shows two spots, one representative of a laser spot and the other of an object. To isolate the laser spot, a second image 422 can be taken with the laser off, leaving only the object. Then, the second image 422 can be subtracted from the first image 420 to arrive at the third image 424. The remaining spot in the third image 424 is the laser spot.

Figure 4C:
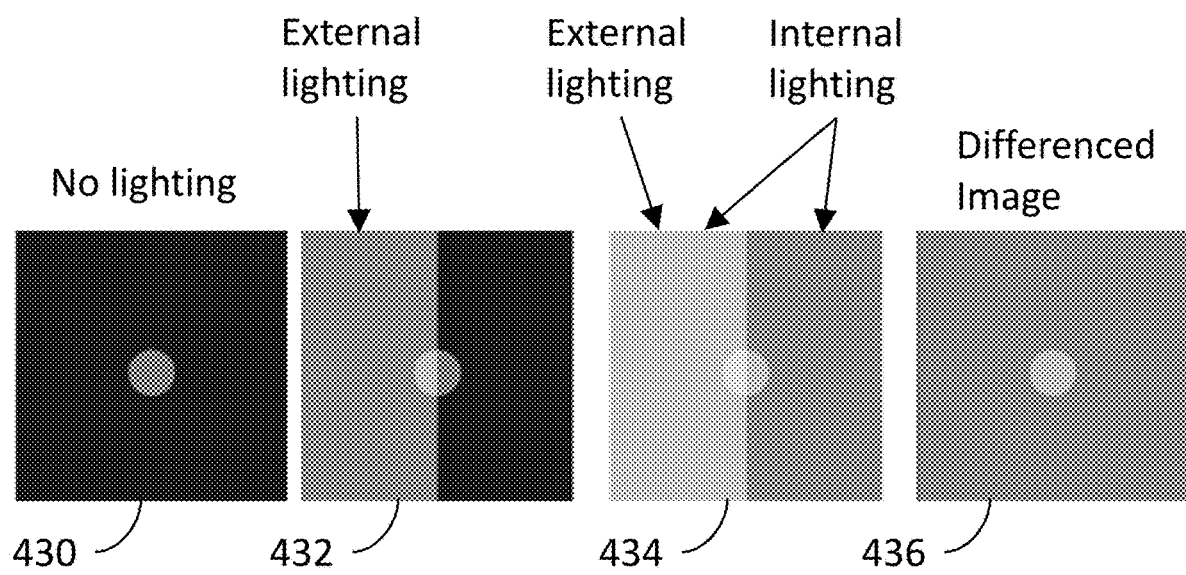
FIG. 4C is a diagram illustrating the differencing of images to isolate a simulated internal lighting effect, consistent with some implementations of the current subject matter.

FIG. 4C is a diagram illustrating the differencing of images to isolate a simulated internal lighting effect, consistent with some implementations of the current subject matter. There can be an object in the CNC machine 100, represented as a circle in first image 430. This could represent, for example an object on the material bed 150 of the CNC machine 100. If, for example, half of the material bed 150 of the CNC machine 100 was illumined by outside lighting, such as a sunbeam, the second image 420 might appear as shown, with the illuminated side brighter than the side without the illumination. It can sometimes be advantageous to use internal lighting during operation, for example to illuminate a watermark, aid in image diagnostics, or simply to better show a user what is happening in the CNC machine. Even if none of these reasons apply, however, internal lighting allows reduction or elimination of the external lighting (in this case the sunbeam) via this method. This internal lighting is represented in the third image 434 by adding a brightness layer to the entire second image 432. To isolate the effect of the internal lighting, the second image 432 can be subtracted from 434 to result in fourth image 436. Here, fourth image 436 shows the area, and the object, as it would appear under only internal lighting. This differencing can allow image analysis to be performed as if only the controlled internal lighting were present, even in the presence of external lighting contaminants.

Machine vision processing of images can occur at, for example, the CNC machine 100, on a locally connected computer, or on a remote server connected via the internet. In some implementations, image processing capability can be performed by the CNC machine 100, but with limited speed. One example of this can be where the onboard processor is slow and can run only simple algorithms in real-time, but which can run more complex analysis given more time. In such a case, the CNC machine 100 could pause for the analysis to be complete, or alternatively, execute the data on a faster connected computing system. A specific example can be where sophisticated recognition is performed remotely, for example, by a server on the internet. In these cases, limited image processing can be done locally, with more detailed image processing and analysis being done remotely. For example, the camera can use a simple algorithm, run on a processor in the CNC machine 100, to determine when the lid 130 is closed. Once the CNC machine 100 detects that the lid 130 is closed, the processor on the CNC machine 100 can send images to a remote server for more detailed processing, for example, to identify the location of the material 140 that was inserted. The system can also devote dedicated resources to analyzing the images locally, pause other actions, or diverting computing resources away from other activities.

In another implementation, the head 160 can be tracked by onboard, real-time analysis. For example, tracking the position of the head 160, a task normally performed by optical encoders or other specialized hardware, can be done with high resolution, low resolution, or a combination of both high and low resolution images taken by the cameras. As high-resolution images are captured, they can be transformed into lower resolution images that are smaller in memory size by resizing or cropping. If the images include video or a sequence of still images, some may be eliminated or cropped. A data processor can analyze the smaller images repeatedly, several times a second for example, to detect any gross misalignment. If a misalignment is detected, the data processor can halt all operation of the CNC machine 100 while more detailed processing more precisely locates exactly the head 160 using higher resolution images. Upon location of the head 160, the head 160 can be adjusted to recover the correction location. Alternatively, images can be uploaded to a server where further processing can be performed. The location can be determined by, for example, looking at the head 160 with the lid camera, by looking at what the head camera 120 is currently imaging, etc. For example, the head 160 could be instructed to move to a registration mark. Then the head camera 120 can then image the registration mark to detect any minute misalignment.

Basic Camera Functionality

The cameras can be, for example, a single wide-angle camera, multiple cameras, a moving camera where the images are digitally combined, etc. The cameras used to image a large region of the interior of the CNC machine 100 can be distinct from other cameras that image a more localized area. The head camera 160 can be one example of a camera that, in some implementations, images a smaller area than the wide-angle cameras.

There are other camera configurations that can be used for different purposes. A camera (or cameras) with broad field of view can cover the whole of the machine interior, or a predefined significant portion thereof. For example, the image data acquired from one or more of the cameras can include most (meaning over 50%) of the working area. In other embodiments, at least 60%, 70%, 80%, 90%, or 100% of the working area can be included in the image data. The above amounts do not take into account obstruction by the material 140 or any other intervening objects. For example, if a camera is capable of viewing 90% of the working area without material 140, and a piece of material 140 is placed in the working area, partially obscuring it, the camera is still considered to be providing image data that includes 90% of the working area. In some implementations, the image data can be acquired when the interlock is not preventing the emission of electromagnetic energy.

In other implementations, a camera mounted outside the machine can see users and/or material 140 entering or exiting the CNC machine 100, record the use of the CNC machine 100 for sharing or analysis, or detect safety problems such as an uncontrolled fire. Other cameras can provide a more precise look with limited field of view. Optical sensors like those used on optical mice can provide very low resolution and few colors, or greyscale, over a very small area with very high pixel density, then quickly process the information to detect material 140 moving relative to the optical sensor. The lower resolution and color depth, plus specialized computing power, allow very quick and precise operation. Conversely, if the head is static and the material is moved, for example if the user bumps it, this approach can see the movement of the material and characterize it very precisely so that additional operations on the material continue where the previous operations left off, for example resuming a cut that was interrupted before the material was moved.

Video cameras can detect changes over time, for example comparing frames to determine the rate at which the camera is moving. Still cameras can be used to capture higher resolution images that can provide greater detail. Yet another type of optical scanning can be to implement a linear optical sensor, such as a flatbed scanner, on an existing rail, like the sliding gantry 210 in a laser system, and then scan it over the material 140, assembling an image as it scans.

To isolate the light from the laser, the laser may be turned off and on again, and the difference between the two measurements indicates the light scattered from the laser while removing the effect of environmental light. The cameras can have fixed or adjustable sensitivity, allowing them to operate in dim or bright conditions. There can be any combination of cameras that are sensitive to different wavelengths. Some cameras, for example, can be sensitive to wavelengths corresponding to a cutting laser, a range-finding laser, a scanning laser, etc. Other cameras can be sensitive to wavelengths that specifically fall outside the wavelength of one or more lasers used in the CNC machine 100. The cameras can be sensitive to visible light only, or can have extended sensitivity into infrared or ultraviolet, for example to view invisible barcodes marked on the surface, discriminate between otherwise identical materials based on IR reflectivity, or view invisible (e.g. infrared) laser beams directly. The cameras can even be a single photodiode that measures e.g. the flash of the laser striking the material 140, or which reacts to light emissions that appear to correlate with an uncontrolled fire. The cameras can be used to image, for example, a beam spot on a mirror, light escaping an intended beam path, etc. The cameras can also detect scattered light, for example if a user is attempting to cut a reflective material. Other types of cameras can be implemented, for example, instead of detecting light of the same wavelength of the laser, instead detecting a secondary effect, such as infrared radiation (with a thermographic camera) or x-rays given off by contact between the laser and another material.

The cameras may be coordinated with lighting sources in the CNC machine 100. The lighting sources can be positioned anywhere in the CNC machine 100, for example, on the interior surface of the lid 130, the walls, the floor, the gantry 210, etc. One example of coordination between the lighting sources and the cameras can be to adjust internal LED illumination while acquiring images of the interior portion with the cameras. For example, if the camera is only capable of capturing images in black and white, the internal LEDs can illuminate sequentially in red, green, and blue, capturing three separate images. The resulting images can then be combined to create a full color RGB image. If external illumination is causing problems with shadows or external lighting effects, the internal lighting can be turned off while a picture is taken, then turned on while a second picture is taken. By subtracting the two on a pixel-by-pixel basis, ambient light can be cancelled out so that it can be determined what the image looks like when illuminated only by internal lights. If lighting is movable, for example on the translation arm of the CNC machine 100, it can be moved around while multiple pictures are taken, then combined, to achieve an image with more even lighting. The brightness of the internal lights can also be varied like the flash in a traditional camera to assist with illumination. The lighting can be moved to a location where it better illuminates an area of interest, for example so it shines straight down a slot formed by a cut, so a camera can see the bottom of the cut. If the internal lighting is interfering, it can be turned off while the camera takes an image. Optionally, the lighting can be turned off for such a brief period that the viewer does not notice (e.g. for less than a second, less than $1/60^{th}$ of a second, or less than $1/120^{th}$ of a second). Conversely, the internal lighting may be momentarily brightened like a camera flash to capture a picture. Specialized lights may be used and/or engaged only when needed; for example, an invisible but UV-fluorescent ink might be present on the material. When scanning for a barcode, UV illumination might be briefly flashed while a picture is captured so that any ink present would be illuminated. The same technique of altering the lighting conditions can be performed by toggling the range-finding and/or cutting lasers as well, to isolate their signature and/or effects when imaging. If the object (or camera) moves between acquisitions, then the images can be cropped, translated, expanded, rotated, and so on, to obtain images that share common features in order to allow subtraction. This differencing technique is preferably done with automatic adjustments in the cameras are overridden or disabled. For example, disabling autofocus, flashes, etc. Features that can ideally be held constant between images can include, for example, aperture, shutter speed, white balance, etc. In this way, the changes in the two images are due only to differences from the lighting and not due to adjustment in the optical system.

Multiple cameras, or a single camera moved to different locations in the CNC machine 100, can provide images from different angles to generate 3D representations of the surface of the material 140 or an object. The 3D representations can be used for generating 3D models, for measuring the depth that an engraving or laser operation produced, or providing feedback to the CNC machine 100 or a user during the manufacturing process. It can also be used for scanning, to build a model of the material 140 for replication.

The camera can be used to record photos and video that the user can use to share their progress. Automatic "making of" sequences can be created that stitch together various still and video images along with additional sound and imagery, for example the digital rendering of the source file or the user's picture from a social network. Knowledge of the motion plan, or even the control of the cameras via the motion plan directly, can enable a variety of optimizations. In one example, given a machine with two cameras, one of which is mounted in the head and one of which is mounted in the lid, the final video can be created with footage from the head camera at any time that the gantry is directed to a location that is known to obscure the lid camera. In another example, the cameras can be instructed to reduce their aperture size, reducing the amount of light let in, when the machine's internal lights are activated. In another example, if the machine is a laser cutter/engraver and activating the laser causes a camera located in the head to become overloaded and useless, footage from that camera may be discarded when it is unavailable. In another example, elements of the motion plan may be coordinated with the camera recording for optimal visual or audio effect, for example fading up the interior lights before the cut or driving the motors in a coordinated fashion to sweep the head camera across the material for a final view of the work result. In another example, sensor data collected by the system might be used to select camera images; for example, a still photo of the user might be captured from a camera mounted in the lid when an accelerometer, gyroscope, or other sensor in the lid detects that the lid has been opened and it has reached the optimal angle. In another example, recording of video might cease if an error condition is detected, such as the lid being opened unexpectedly during a machining operation. The video can be automatically edited using information like the total duration of the cut file to eliminate or speed up monotonous events; for example, if the laser must make 400 holes, then that section of the cut plan could be shown at high speed. Traditionally, these decisions must all be made by reviewing the final footage, with little or no a priori knowledge of what they contain. Pre-selecting the footage (and even coordinating its capture) can allow higher quality video and much less time spent editing it. Video and images from the production process can be automatically stitched together in a variety of fashions, including stop motion with images, interleaving video with stills, and combining video and photography with computer-generated imagery, e.g. a 3D or 2D model of the item being rendered. Video can also be enhanced with media from other sources, such as pictures taken with the user's camera of the final product.

Additional features that can be included individually, or in any combination, are described in the sections below.

Sealed Optical System

Figure 5:
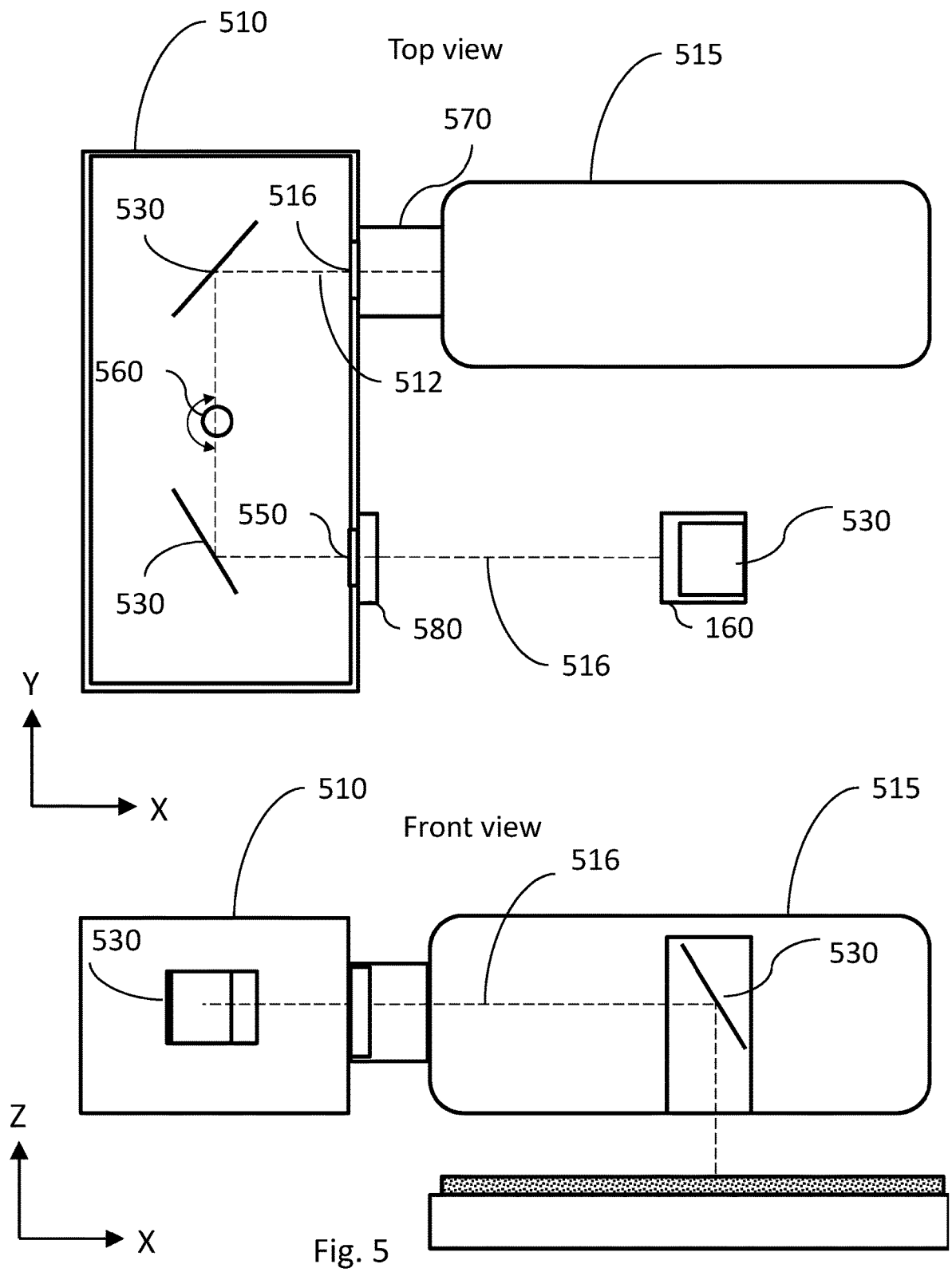
FIG. 5 is a diagram illustrating a sealed optical system, consistent with some implementations of the current subject matter.

FIG. 5 is a diagram illustrating a sealed optical system 510, consistent with some implementations of the current subject matter. The top portion of FIG. 5 illustrates a top view and the bottom portion of FIG. 5 illustrates a bottom view where the laser beam is directed down from the head to the material. In one implementation, for example where the CNC machine 100 acts as a laser cutter, there can be a sealed optical system 510 to guide a laser beam from the laser 515 to the head 160. As described below, the sealed optical system 510 can be combined with the laser 515 to result in a closed system where one or more of the turning mirrors or laser optics are prevented from being exposed to outside (or otherwise contaminated) air, with the possible exception of the outermost optic, which can be a flat aperture acting as a window that can be easily accessed and cleaned. The outermost optic could also be a lens.

While some implementations describe two turning mirrors in a sealed optical system, other implementations can include any number of turning mirrors, lenses, or other optical components fixed in non-adjustable positions. Such implementations can be in a sealed optical system, but can also be in an optical system that is not sealed from the remainder of the CNC machine interior volume. For example, the non-adjustable optical components can be not enclosed by anything other than the CNC machine housing.

In one implementation, the sealed optical system 510 can include an entry aperture 540, a housing, two turning mirrors 530 oriented at a fixed angle to each other which in one implementation is 90°, and a window attached to an exit aperture 580. The sealed optical system 510 can also include one or more pivots 560, possibly on different axes, to allow the sealed optical system 510 to rotate, thus changing the angle of the fixed turning mirrors 530 relative to an incoming laser beam 512 from the laser 515. The mirrors can also be mounted so that they are independently adjustable within the sealed optical system 510. In the example shown where the axis of the pivot 560 is perpendicular to the diagram and the angle of the mirrors is 90°, by adjusting the angle of the sealed optical system 510, the separation of the incoming laser beam 512 and an outgoing laser beam 516 to the head 160 can be adjusted without affecting the angle of the outgoing laser beam 516, as would occur if a single mirror 530 was adjusted independently. Because in this example the turning mirrors 530 are oriented to always result in a 180 degree turn regardless of the angle of the sealed optical system 510, rotating the sealed optical system 510 only translates the outgoing laser beam 516 while retaining parallelism between the incoming laser beam 512 and the outgoing laser beam 516. Such a translation can be adjusted to align the laser beam to optical elements in the head 160.

Strategies for Engineering Robustness into Sealed Optical Systems

Minimization of Beam Path

In an extension to the above implementation, a strategy for minimizing laser beam alignment errors, may involve engineering or optimizing the system such that the beam path is as short as possible. Reducing the length of the beam path may achieve benefits including better overall alignment of the optical system, due to the corresponding reduction in (even small) error propagation over shorter distances. As an example, a laser tube 570 and its associated beam path may be housed or affixed directly to the moving rail of the CNC machine, and moved in tandem.

Use of Fixed and/or Partially-Fixed Mirrors

Another extension to the above implementation, is the use of fixed or partially-fixed mirrors (i.e., mirrors that may be able to rotate in one dimension but not two) which may be exploited to reduce or remove the hazardous requirements for users to perform manual mirror alignments or adjustments (e.g., misalignments that may occur from CNC machine vibration during shipping, transportation, operations or other movements). Removal of the dependence on manual adjustability of the laser, thus increases the importance of reliable and robust manufacturing. Consequently, a variety of novel engineering approaches that are intended to endure for much of the life of the machine may be implemented to improve the quality of the product by reducing manufacturing variability, tolerances, etc. For example, one implementation for increasing the rigidity of a mirror's position, may involve the use of at least one fixture designed for this purpose; one such example may include a fixture that a mirror slides into and is held in a fixed place, for example by a spring. In a different approach, an adjustable fixture may be used, but the adjustment mechanisms are permanently fixed at the factory, preventing both drift due to mechanical stress and user-initiated adjustments.

Figure 6:
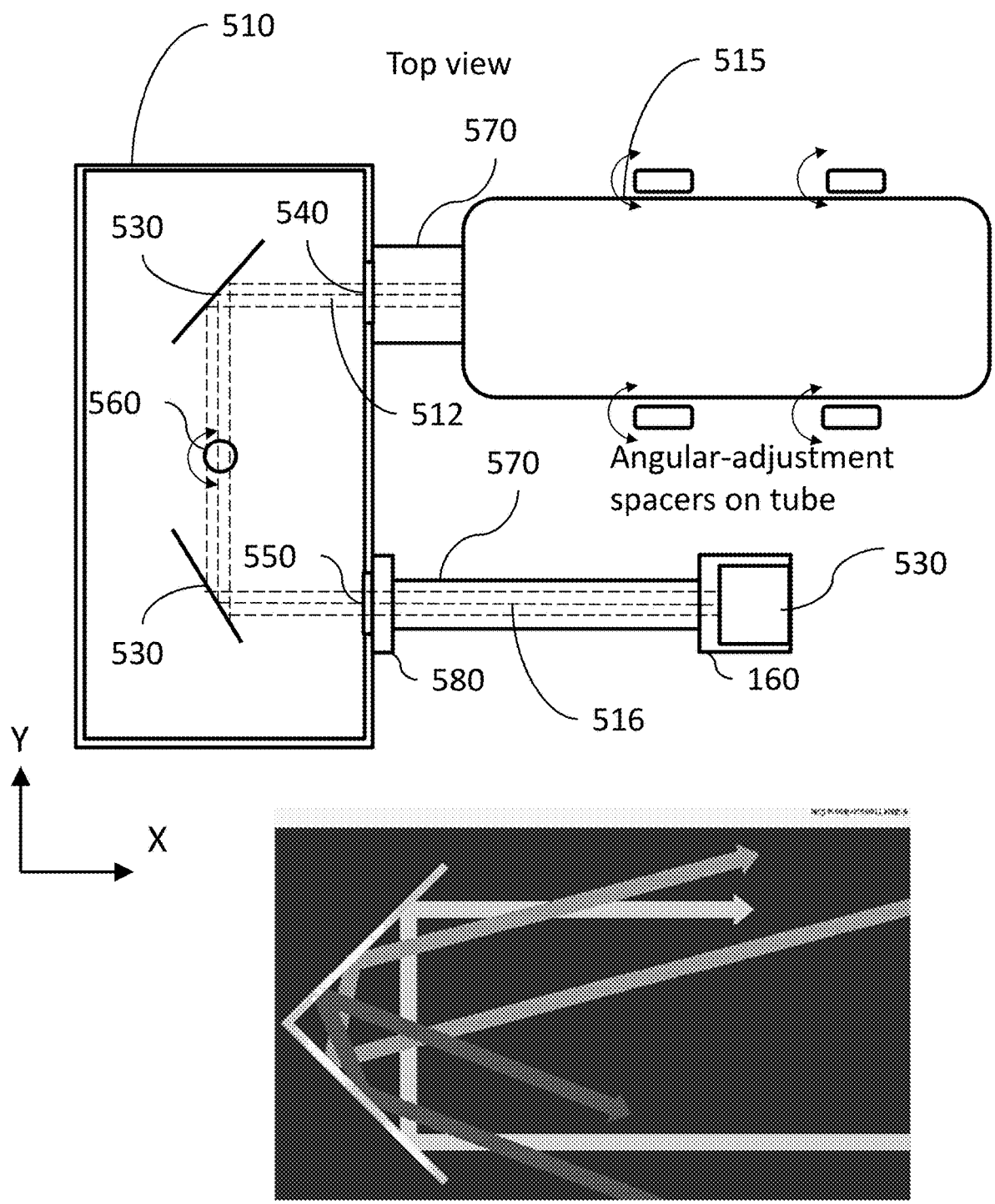
FIG. 6 is a diagram illustrating optical components acting as a retroreflector, consistent with some implementations of the current subject matter.

FIG. 6 is a diagram illustrating optical components acting as a retroreflector, consistent with some implementations of the current subject matter. Another non-encompassing example involves the exit aperture from the laser tube 570; in the present implementation, the beam is engineered to exit in parallel, however location of the exit aperture may vary due to manufacturing variations, (e.g., laser tube defects). This is illustrated in the top portion of FIG. 6, by the multiple possible beam paths that could result from a misalignment. In this instance, the angle of the laser tube 570 may be the subject of angular corrections, for example via the use of spacers or other such fittings that serve to maintain parallelism of the beam and the rail. These spacers can adjust offsets or angular displacements of the laser 515 or other optical components. In some implementations, the spacers can pivot, as shown in FIG. 6 other implementations, the spacers can be linearly offset to position the laser at a particular angle. For example, the right pair set of spacers can be offset in the +Y direction from the left pair of spacers. This would give the laser 515 an angular tilt resulting in the laser housing having an angle going down and to the left. Such an adjustment can be implemented to correct for a laser tube or lens that was causing the laser 515 to have an undesired angle up and to the left, when exiting the laser housing.

In combining several of the above approaches, it is possible to exploit fixed the relationships between the beam, the rail, and the head 160 to achieve robust optical alignment and positioning. For instance, utilization of 90 degree angles between components, as shown earlier in FIG. 6, creates a retroreflector, which ensures that the outgoing beam 516 is parallel to the incoming beam 512. A simplified example of a retroreflector is shown in the bottom portion of FIG. 6, where two mirrors oriented at 90 degrees relative to each other maintain parallelism between incoming and outgoing light rays. Introduction of a pivot point within the precise center of the retroreflector permits single-axis rotation, allowing for translation of the beam. The combination of these approaches ensure the beam coming out of the laser tube 570 is parallel to rail, and re-confirms this parallelism to the rail and head after the turning mirrors direct the desired turn back into the laser work area.

Figure 7:
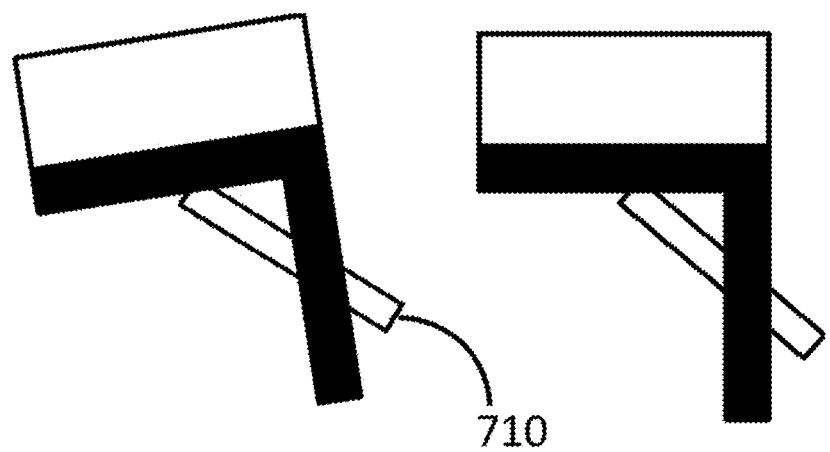
FIG. 7 is a diagram illustrating a correction mechanism to adjust vertical tilt on a retroreflector, consistent with some implementations of the current subject matter.

FIG. 7 is a diagram illustrating a correction mechanism to adjust vertical tilt on a retroreflector, consistent with some implementations of the current subject matter. In some implementations, there can be a two-mirror retroreflector, guaranteeing that the beam comes out parallel to the incoming beam in the X plane. However, it can still tilt up and down in the Y plane. To remedy this, the mirrors can be mounted on a folded bracket that is manufactured to an incorrect angle, and includes a screw 710 that can be used to drive the bracket to the correct angle. The bracket can be driven to the correct angle at the factory, and the screw may be locked in place with adhesive.

In other implementations, instead of a two-mirror retroreflector, three mirrors may be arranged as in the corner of a cube. In this case, the exiting laser beam is guaranteed to be parallel to the incoming laser beam both horizontally and vertically, and this adjustment is not required.

Optical Windows

The windows can be any sort of removable optical window suitable for the transmission of laser light from the sealed optical system 510 to the head 160. In one example, the laser light wavelength can be 10.6 microns emitted from a carbon dioxide laser, and the window can be Zinc Selenide (ZnSe). The windows can act to substantially seal the sealed optical system 510 against air which can contain dust, smoke, or other contaminants that can coat any of the other optical elements in the sealed optical system 510 or in the laser 515. In place of a window, in the laser 515 or head 160, pressurized air can be introduced by means of a fan or a compressed air line, preventing contaminants from entering by maintaining positive pressure in the enclosure. Alternatively, the exit aperture 550 can simply be extended, optionally with baffles, to prevent contaminants from migrating into the sealed optical system 510. Other techniques can be used to reduce or eliminate contamination of the output window including, the direction of clean air at the window, the design of airflow in the system so that dirty air is not directly routed at the window, and other measures.

Additional Strategies for Establishing Optical Alignment

As described above, there can be any number of turning mirrors, or other optical elements, oriented at a fixed angle to each other to deliver electromagnetic energy from a laser to the material. In some implementations, at least one of the turning mirrors can be mounted at the fixed angle, for example, by adding one or more spacers until a correct angle is achieved. Also, for the turning mirrors mounted at the fixed angle, they cannot be adjusted to change the fixed angle after being mounted. For example, the mirror can be mounted in a particular position or orientation during the manufacturing or assembly process, but thereafter, it cannot be adjusted without removing or damaging the turning mirror or the mounting holding the turning mirror. In other implementations, each of the turning mirrors cannot be adjusted to change the fixed angle after the mounting of each of the turning mirrors.

In some implementations, a turning mirror can be in a mount formed from the housing of the computer numerically controlled machine. In other implementations, the turning mirror can be in a removable mount fixedly attached to the computer numerically controlled machine and is not adjustable to change the fixed angle. For example, a turning mirror can be placed into a mount that can be attached to the CNC machine with fasteners, magnetic retainers, compression fittings, or the like. The mount and turning mirror can be removed from the CNC machine, but when fully and properly mounted, can have an orientation and position that only results in the fixed angle.

In yet other implementations, there can be an adjustment mechanism configured to adjust a position or an orientation of the turning mirrors simultaneously without changing the fixed angle. For example, the sealed optical system contains a pivot that allows the sealed optical system to rotate about the pivot. As a result, the relative orientation of the turning mirrors in the sealed optical system does not change as the angle between the turning mirrors can remain fixed. In other examples, it is possible to rotate about a point which is coaxial with the desired optical center of the system.

In another implementation, one or more of the turning mirrors can be at a fixed angle relative to some, but not necessarily all, of the other turning mirrors or optical elements. For example, referring to FIG. 5, the laser head can move horizontally relative to the turning mirror closest to it. This horizontal movement does not change the fixed angle between a coplanar turning mirror in the laser head (not shown, but for example used to direct the laser beam downward). However, this horizontal movement can change the angle with the other turning mirror because the horizontal movement is not on the line directly connecting the two mirrors. More generally, in some implementations, the turning mirrors can be fixed at an angle relative to only one adjacent turning mirror. Similarly, in other implementations, the turning mirrors can be can be fixed at an angle relative to all adjacent optical elements that provide or receive light to or from the particular turning mirror.

In some implementations, there can also be an adjustment mechanism configured to adjust a position or an orientation of the plurality of optical elements simultaneously without changing the fixed angle. The adjustment mechanism can include a pivot located at a center of the optical elements and the optical elements are configured to act as a retroreflector.

The optical components can be affixed in the computer numerically controlled machine that is not adjustable to change an angle or a position of the plurality of optical components after affixing. The affixing can include at least one of welding, screwing, bolting, and gluing.

Additional Strategies for Maintaining Optical Alignment

Over time and repeated use, factors that lead to system wear and tear (including mechanical vibration consistent with normal operation of a CNC machine), can impact the optical alignment system, and may for example, result in misalignment. Engineering strategies that improve the robustness of the system can be adopted to enhance system longevity, reduce servicing requirements, etc.

In one such implementation, this concept extends to engineering the CNC machine's optical components so that the mechanical axis is coincidental with the optical axis. In some cases, this may be achieved by altering the center of mass of optical system components to prevent asymmetric distribution of stress on the overall system that may be caused over time by normal machine vibration. If the center of mass is not directly over the optical axis, the system will pivot around the center of mass, resulting in an asymmetric flexing. The amount of flex (i.e., the moment of inertia around that axis) will be proportional to the differential between the center of mass and the optical axis; if that difference is negligible, then the moment of inertia is effectively zero.

Figure 8:
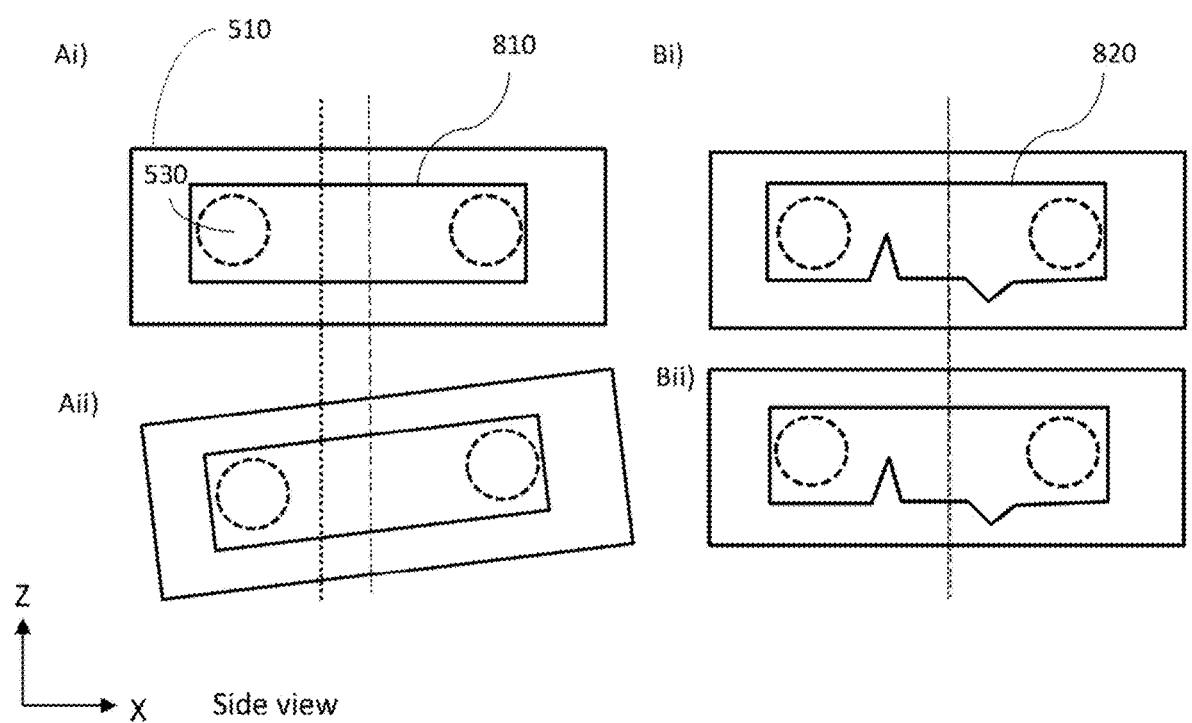
FIG. 8 is a diagram illustrating how the center of mass of optical components may be engineered to minimize its differential from the optical axis, consistent with some implementations of the current subject matter.

FIG. 8 illustrates this concept using the example of a first mirror mount 810, which has a different center of mass than the optical system 510. This differential in the center of mass between the first mirror mount 810 and the optical system 510 may cause mechanical stress on the optical system 510, for instance, as one side of the first mirror mount 810 pivots about its center of mass and rotates downward over time, thereby causing beam misalignment. In such a case, the mirrors 530 may still operation as a retroflector, but the optical system 510 will no longer be correctly aligned.

FIG. 8 further illustrates an example of an engineering strategy for maintaining the alignment of the optical system 510. For instance, the alignment of the optical system 510 may be maintained by redistributing the weight of a second mirror mount 820 such that the center of mass of the second mirror mount 820 is aligned with that of the optical system 510. This may be achieved by a variety of strategies including, for example, machining the second mirror mount 820 in a manner that reduces the overall weight of the second mirror mount 820 is reduced. As shown in FIG. 8, the second mirror mount 820 may include strategic cutouts that reduce the overall weight of the second mirror mount 820. Alternatively and/or additionally, the second mirror mount 820 may be machined to achieve a desired center of mass, for example, which aligns with that of the optical system 510.

Other strategies may be employed to prevent cases of beam misalignment. In one implementation, an auto-alert system may be used to automatically detect system failures over time. For example, a system that measures the height of internal components (such as by taking absolute or relative measurements with respect to other components) and monitors for values within accepted bounds is one such strategy that may be employed to flag to users when routine servicing or maintained may be needed. For example, a variety of sensors may be used to determine the positioning of the end-plate either with respect to known parameters (e.g. the distance from the machine bed determined by height sensors, or whether the end-plate is parallel by leveling sensors).

In another implementation, the use of flexible or less-rigid fixtures that resist deforming under mechanical stress may be used. For example, the mirror mount may be composed, in whole or in part, of an elastic mount structure. Alternatively, the use of hinge joints or other mechanisms that reduce the strain on the plate itself may be employed for such a purpose. In yet another implementation, the use of strategically-placed cut-outs on the mirror-plate itself may be engineered such that any distribution of stress acts in a symmetrical way on such fixtures.

While the above features are described with regards to turning mirrors, similar fixed mountings can be applied to any other components of the CNC machine as well, for example, lenses, optical filters, polarizers, components of the laser, the entire laser, the laser head, or the like.

In various implementations of the current subject matter, a system can include a head of a computer numerically controlled machine configured to deliver electromagnetic energy sufficient to cause a change in a material at least partially contained within an interior space of the computer numerically controlled machine. The system can further include an optical system comprising a plurality of optical elements in the computer numerically controlled machine, the plurality of optical elements oriented at a fixed angle to each other to deliver the electromagnetic energy from the head to the material.

The plurality of optical elements can include at least one of a mirror and a lens. At least one of the plurality of optical elements can be mounted at the fixed angle and cannot be adjusted to change the fixed angle after the mounting. Each of the plurality of optical elements cannot be adjusted to change the fixed angle after the mounting of each of the plurality of optical elements. The at least one of the plurality of optical elements can be mounted at the fixed angle at least by adding one or more spacers until a correct angle is achieved. The least one of the plurality of optical elements can be in a mount formed from the housing of the computer numerically controlled machine.

The system may further include an adjustment mechanism configured to adjust a position or an orientation of the plurality of optical elements simultaneously without changing the fixed angle. The adjustment mechanism can include a pivot located at a center of the plurality of optical elements, wherein the plurality of optical elements are configured to act as a retroreflector.

The plurality of optical components can be affixed in the computer numerically controlled machine such that an angle or a position of the plurality of optical components cannot be adjusted after the affixing. The affixing can include at least one of welding, screwing, bolting, and gluing.

The head can be coupled with a moving rail of the computer numerically controlled machine. The head and the moving rail can be configured to move in tandem in order to minimize a path of the electromagnetic energy. The optical system can be associated with a first center of mass. The plurality of optical elements can be associated with a second center of mass. The first center of mass can be aligned with the second center of mass. A weight of at least one of the plurality of optical elements can be reduced in order to align the first center of mass with the second center of mass. The weight of the at least one of the plurality of optical elements can be reduced by at least reducing a weight of a mount housing the at least one of the plurality of optical elements. The weight of the mount can be reduced by machining the mount to include one or more cutouts. At least one of the plurality of optical elements can be housed in an elastic mount configured to reduce mechanical stress against the optical system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A system comprising:
a head of a computer numerically controlled machine configured to deliver, to a material at least partially contained within an interior space of the computer numerically controlled machine, an electromagnetic energy to cause a change in the material;
a source emitting the electromagnetic energy delivered by the head;
a sealed optical system comprising a housing and a plurality of optical elements enclosed in the housing, the plurality of optical elements including a first optical element and a second optical element oriented at a fixed angle relative to each other, the fixed angle having a magnitude configured to direct the electromagnetic energy from the source of the electromagnetic energy to the head; and
an adjustment mechanism configured to adjust a position and/or an orientation of the sealed optical system without changing the fixed angle between the first optical element and the second optical element, the adjustment mechanism comprising one or more pivots configured to rotate the sealed optical system in order to adjust a separation between the incoming beam of electromagnetic energy and the outgoing beam of electromagnetic energy.

2. The system of claim 1, wherein the plurality of optical elements comprise at least one of a mirror and a lens.

3. The system of claim 1, further comprising one or more spacers to achieve the fixed angle between the first optical element and the second optical element.

4. The system of claim 1, wherein the first optical element and the second optical element are disposed in a mount formed from a housing of the sealed optical system.

5. The system of claim 1, wherein the first optical element is mounted by at least one of welding, screwing, bolting, and gluing.

6. The system of claim 1, wherein the head, the source of the electromagnetic energy, and the sealed optical system are coupled with a moving rail of the computer numerically controlled machine, and wherein the head, the source of the electromagnetic energy, and the sealed optical system are configured to move in tandem along the moving rail in order to minimize a length of a path of the electromagnetic energy between the source of the electromagnetic energy and the head.

7. The system of claim 1, wherein the sealed optical system is associated with a first center of mass, wherein the first optical element is associated with a second center of mass, and wherein the first center of mass is aligned with the second center of mass.

8. The system of claim 7, wherein the first center of mass is aligned with the second center of mass by at least including, in a mount housing the first optical element, one or more cutouts to minimize a weight of the mount.

9. The system of claim 1, wherein the first optical element is housed in an elastic mount configured to minimize a mechanical stress against the sealed optical system.

10. The system of claim 1, wherein the sealed optical system prevents the plurality of optical elements from being exposed to contaminants.

11. The system of claim 1, wherein the one or more aperture windows are formed form a zinc selenide.

12. The system of claim 1, wherein the magnitude of the fixed angle is further configured to cause the outgoing beam of electromagnetic energy to be substantially parallel to the incoming beam of electromagnetic energy.

13. The system of claim 1, wherein the magnitude of the fixed angle is 90 degrees.

* * * * *